United States Patent
Tsukishima et al.

(10) Patent No.: US 6,647,304 B2
(45) Date of Patent: Nov. 11, 2003

(54) PRODUCT MANAGEMENT METHOD AND SYSTEM

(75) Inventors: Takahiro Tsukishima, Zushi (JP); Masayuki Kan, Yokohama (JP); Kyoji Chiba, Hadano (JP); Koichi Kitamura, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 94 days.

(21) Appl. No.: 09/796,687

(22) Filed: Mar. 2, 2001

(65) Prior Publication Data

US 2002/0042662 A1 Apr. 11, 2002

(30) Foreign Application Priority Data

Oct. 10, 2000 (JP) ........................................ 2000-309740

(51) Int. Cl.$^7$ ............................................... G06F 17/60
(52) U.S. Cl. .............................. 700/95; 700/95; 705/29
(58) Field of Search ................... 700/95–106, 225–227, 700/231–237, 250, 257; 705/7, 8, 10, 22, 28, 29

(56) References Cited

U.S. PATENT DOCUMENTS

| | | | | |
|---|---|---|---|---|
| 4,759,123 A | * | 7/1988 | Ohta et al. | ..................... 29/832 |
| 5,307,261 A | | 4/1994 | Maki et al. | ................. 364/401 |
| 5,311,424 A | | 5/1994 | Mukherjee et al. | ......... 364/401 |
| 5,654,902 A | * | 8/1997 | Scheidt et al. | ......... 364/551.01 |
| 5,999,908 A | * | 12/1999 | Abelow | .......................... 705/1 |
| 6,058,373 A | * | 5/2000 | Blinn et al. | ..................... 705/26 |
| 6,246,919 B1 | * | 6/2001 | Hassel | ......................... 700/116 |
| 6,249,714 B1 | * | 6/2001 | Hocaoglu et al. | ............. 700/97 |
| 2002/0072986 A1 | * | 6/2002 | Aram | ........................... 705/26 |
| 2002/0143564 A1 | * | 10/2002 | Webb et al. | .................... 705/1 |

FOREIGN PATENT DOCUMENTS

| | | | |
|---|---|---|---|
| JP | A-5-165843 | 7/1993 | |
| JP | A-5-189445 | 7/1993 | |
| WO | WO-01/11530 A1 | * 2/2001 | ........... G06F/17/60 |

* cited by examiner

*Primary Examiner*—Leo Picard
*Assistant Examiner*—Sean Shechtman
(74) *Attorney, Agent, or Firm*—Antonelli, Terry, Stout & Kraus, LLP

(57) ABSTRACT

A product configuration is managed on a product basis for each of component parts included in products from manufacturing to disposal of the products. A product manufacturer device, part manufacturer devices, and a device of a customer who possesses a product are interconnected through a communication line. The product manufacturer device includes configuration information on each of component parts in the product on a product number basis, and provides information and services on the product. The part manufacturer device includes configuration information on each of lower parts which include the component parts on a manufacturing lot or product number basis, and provides information and services on each of the parts. When the product configuration is changed, such change is reflected to the configuration information of the product and the component parts.

18 Claims, 24 Drawing Sheets

(2) WHEN PART b (PRODUCT NUMBER □□□) IS INCORPORATED
IN PRODUCT A (PRODUCT NUMBER △△△) LATER (3) WHEN PART a (PRODUCT NUMBER ×××) IS REMOVED FROM PRODUCT A (PRODUCT NUMBER △△△) LATER (1) WHEN PART a (PRODUCT NUMBER ×××) IS INCORPORATED IN PRODUCT A (PRODUCT NUMBER △△△)

(2) WHEN PART b (PRODUCT NUMBER □□□) IS INCORPORATED
IN PRODUCT A (PRODUCT NUMBER △△△) LATER (3) WHEN PART a (PRODUCT NUMBER ×××) IS REMOVED FROM PRODUCT A (PRODUCT NUMBER △△△) LATER (1) WHEN PART a (PRODUCT NUMBER ×××) IS INCORPORATED IN PRODUCT A (PRODUCT NUMBER △△△)

(2) WHEN PART a (PRODUCT NUMBER ×××) IS REMOVED FROM PRODUCT A (PRODUCT NUMBER △△△) LATER

PRODUCT MANAGEMENT METHOD AND SYSTEM

FIELD OF THE INVENTION

The present invention relates to a product management system and management method, and more particularly, to a product management system and management method which can manage the product configuration on a product-by-product basis from manufacturing to disposal of a product for each of component parts that comprise the product.

BACKGROUND OF THE INVENTION

Generally, products such as home electric appliances, information related devices and so on may be returned to their manufacturing companies for replacement of parts and so on in order to fix a failure or upgrade the functional performance, after they have been manufactured by the manufacturing companies (including associated assembling companies) and once delivered to users. To this end, the manufacturing companies manage component parts for each type of products manufactured thereby and also manage information on the first users of respective products. The manufacturing companies, however, cannot manage these items unless information is provided from the users and so on about a change in configuration resulting from a repair or modification to each of their products, a change of the owner due to resale or the like, and so on, once their products have been sold to the users.

As prior art techniques which permit the configuration of products to be managed for each user, those described in JP-A-5-189445 (EPO520923), JP-5165843 (U.S. Pat. No. 5,307,261) and so on are known. These prior art techniques are intended for use by each product manufacturer to manage the product configuration for each of product types and further manage the product configuration of products purchased by each user based on the management information.

The foregoing prior art techniques, however, can be applied only to manufacturing companies which handle large scaled products such as a computer system, and their users, but not to home electric appliances for use by individuals, personal information related devices such as PC, and so on. This is because manufacturing companies are not provided with information on these personally used devices after they have been once sold, even if such a product has been transferred to a different owner, or even if such a product has been repaired. Also, even if prior art techniques as described above are available for application in such personal products, the manufacturing companies encounter difficulties in supporting an immense number of products and users.

Stated another way, the aforementioned prior art techniques imply problems in that the manufacturing companies cannot manage the product configuration for individual products after they have been sold, and cannot even manage where the products exist.

SUMMARY OF THE INVENTION

It is an object of the present invention to solve the problems of the above-mentioned prior art techniques and provide a product management system and management method which are capable of managing the product configuration on a product-by-product basis for each of parts comprising a product from manufacturing to disposal of the product and also capable of managing, to some degree, where individual products exist during their lifetime.

According to the present invention, the above object is achieved in a product management system comprising a product manufacturer device, a part manufacturer device and a device of a customer possessing a product, interconnected through a communication line, for managing the configuration of a product on a product number basis, and on a product number or manufacturing lot basis for each type of component parts which comprise the product, wherein the manufacturer company device comprises a function of providing configuration information on component parts which comprise each product, and information and services on the product, and the part manufacturer device comprises a function of providing configuration information on lower parts which comprise each part, and information and services on the part.

Also, the above object is achieved by making the information and services on the product and the part available to a customer who possesses the product, parties concerned who are involved in sales, manufacturing and maintenance of the product and respective component parts which comprise the product, the product itself, the respective component parts themselves which comprise the product, or third parties including public organizations.

Further, the above object is achieved in a product management method for managing a product configuration on a product number basis, and on a product number or manufacturing lot basis for each type of component parts which comprise the product, among a product manufacturer, a part manufacturer and a customer who possesses the product, wherein the product manufacturer provides configuration information on component parts which comprise each product, and information and services on the product, and the part manufacturer device provides configuration information on lower parts which comprise each part, and information and services on the part. Also, the above object is achieved by changing or updating the configuration information on component parts which comprise each product, and the configuration information on lower parts which comprise each of the component parts, when the product configuration of the product is changed.

DESCRIPTION OF THE EMBODIMENT

In the following, an embodiment of a product management system and management method according to the present invention will be described in detail with reference to the accompanying drawings.

Figure 1:
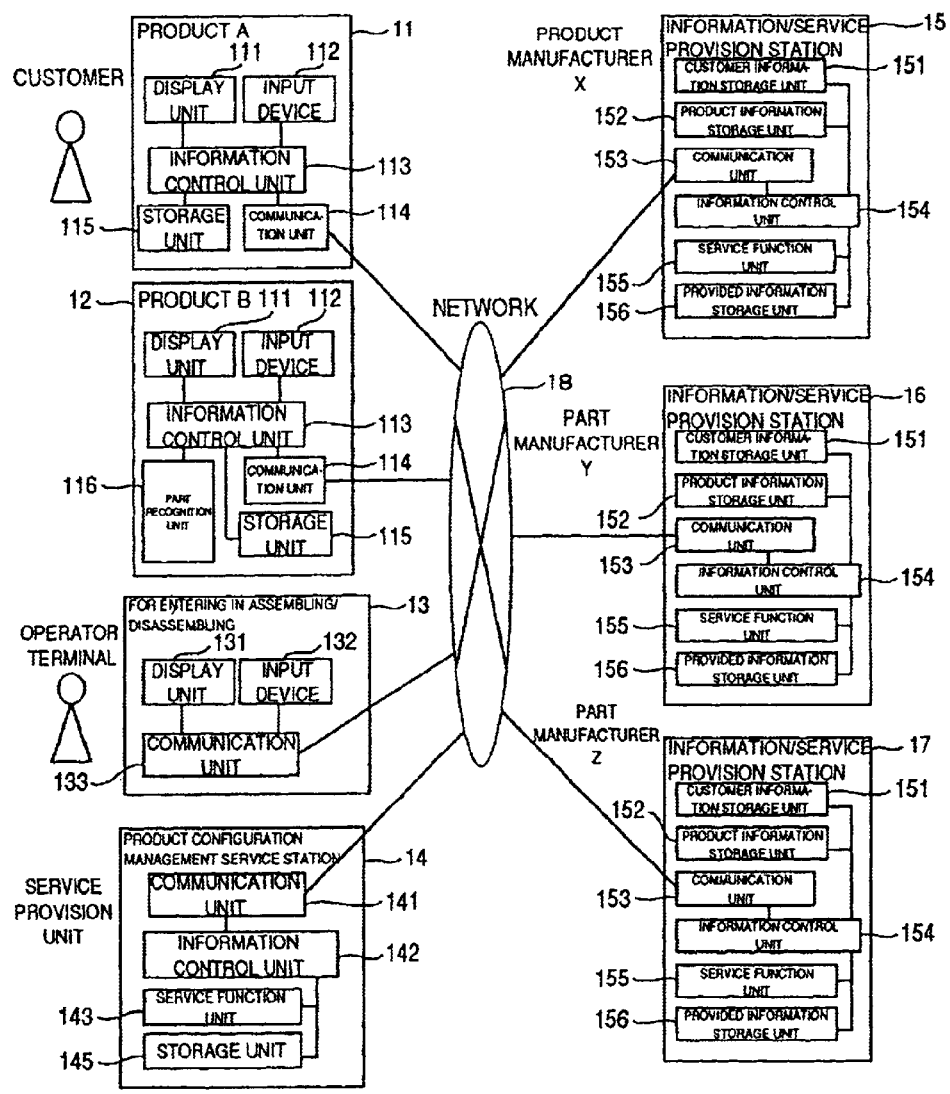
FIG. 1 is a block diagram illustrating the configuration of a product management system according to an embodiment of the present invention.

FIG. 1 is a block diagram illustrating the configuration of the product management system according to one embodiment of the present invention. In FIG. 1, the product management system comprises a product A 11; a product B 12; an operator terminal 13; a product configuration management service station 14; information/service provision stations 15–17; a network 18; display units 111, 131; input devices 112, 132; information control units 113,142, 154; communication units 114,133,141,153; storage units 115, 145; a part recognition unit 116: a customer information storage unit 151; a product information storage unit 152; a service function unit 155; and a provided information storage unit 156.

In the product management system according to the embodiment of the present invention illustrated in FIG. 1, assume that the products A 11, B 12 are products purchased by a customer, and each have the storage unit 115 which has previously recorded its product number (including the type of the product and so on). Assume also that each of component parts incorporated in these products has a label on which the product name, product number and so on of the part are readably printed, or has a ROM or the like which has such information recorded therein. In the illustrated example, each of the products A 11, B 12 comprises the display unit ill, input device 112, communication unit 113, and storage unit 115. The products A 11, B 12 may be, for example, a personal computer (PC), a television set equipped with a touch panel based input mechanism, or any other such device These products A 11, B 12 are capable of transmitting the product numbers to the information/service provision station 15 and receiving service information therefrom. In the following, customer's devices including the products as mentioned above will be collectively called the customer devices. The customer devices include a product which comprises a storage unit, a communication unit, a display unit and an input device, or a product which comprises at least a storage unit out of a storage unit, a communication unit, a display unit and an input device, or a device having a function unit, which is not provided in the abovementioned products, out of a communication unit, a display unit and an input device.

The information/service provision station 15 possessed by a product provider, which is a product manufacturer, is installed in a server of the product provider, and comprises the customer information storage unit 151; product information storage unit 152; communication unit 153; information control unit 154; service function unit 155; and provided information storage unit 156. The customer information storage unit 151 is responsive to a request from a customer, who has a product for which the customer wants to receive a service, to create a customer page for managing individual information of the customer, and stores a large number of such customer pages as a customer database (DB). The product information storage unit 152 stores a large number of product home pages, as a product DB, which have been created corresponding to each of product numbers assigned to a variety of products provided by the product provider. The product home page corresponding to each of the product numbers assigned to a variety of products in the product DB stored in the product information storage unit 152 records the names of various parts which comprise the associated product, the product number, and so on.

The service function unit 155 executes functions for providing a variety of services corresponding to a product possessed by a customer. The provided information storage unit 156 stores a variety of information which can be provided to the customer. The information control unit 154 in turn controls the overall information/service provision station 15; acquisition of customer information from a user device connected thereto through the communication unit 153; provision of information to customers; execution of services for products; and so on. Information possibly provided in this event may include, by way of example, operation manuals of products, defect information, version-up information, maintenance information, attention information, future new product information, information on discount for a customer who has accessed a product home page, and so on.

The information/service provision stations 16, 17 possessed by part providers, which are part manufacturers, are configured in a manner similar to the aforementioned information/service provision station 15, and have a home page for each of products provided by manufacturing companies, and manage respective parts provided thereby to these products. A home page for managing a product and parts provided thereto records the names of various lower parts which comprise each of component parts of the product, their product numbers, and so on. A part manufacturer may be a part manufacturer which delivers parts to a product manufacturer, a part manufacturer which delivers lower parts to a higher part manufacturer, and so on.

The operator terminal 13 refers to a terminal possessed by a product manufacturer, an assembling operator of a part manufacturer, a disassembler, a dismounting dealer, or an operator of a dealer which is engaged in repair or modification of products, and comprises the display unit 131; input device 132; and communication unit 133. When a product is manufactured, dismounted or repaired, an operator who uses this terminal 13 can instruct rewriting or the like of information on associated home pages managed by the aforementioned product manufacturer and part manufacturer, as described later, to reflect a change in the product configuration to the respective home pages.

The product configuration management service station 14, which comprises the communication unit 141; information control unit 142; service function unit 143; and storage unit 145, manages URLs of home pages managed by servers installed in the aforementioned product manufacturer and part manufacturers as well as manages the product configuration.

The home pages managed by the servers of the product manufacturer and part manufactures are linked to one another, so that the name of a part forming part of a product, its product number or the like found in the home page of the product, for example, can be used to access a home page corresponding to the part created by the part manufacturer. Also, an access in the reverse direction can be made in a similar manner.

Figure 2:
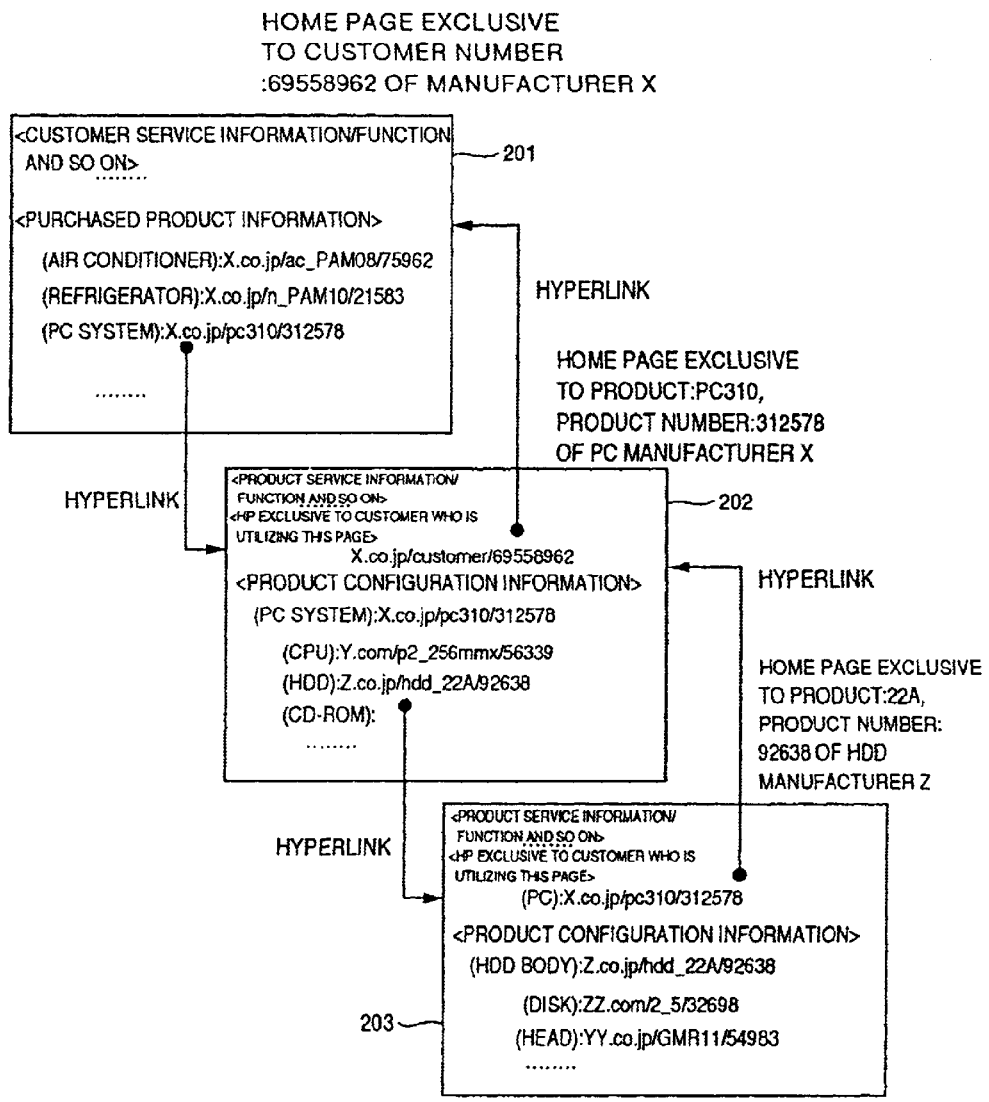
FIG. 2 is a diagram for explaining how a link is extended from one home page to another.

FIG. 2 shows how such home pages are linked to one another, and will be explained below.

As described above, the server in the product manufacturer manages home pages 201 exclusive to individual customers, and a home page 202 for each of product numbers assigned to products. The server in the part manufacturer in turn manages home pages of products and parts incorporated in the products. In FIG. 2, the home page 201 exclusive to a customer manages a plurality of products purchased by the customer from the product manufacturer which manages this home page, together with the product names and product numbers. In this example, the home page shows that a customer allocated a customer number 69558962 has purchased an air conditioner, a refrigerator, a PC system from the product manufacturer, and manages the products together with their product names and product numbers. From each of these products, a hyperlink is extended, so that the home pages 202 of the respective products can be accessed. The customer may access this home page 201 from a device possessed by him, and further access the home pages 202 of the respective products 202 from the home page 201 to acquire service information and so on on the products.

FIG. 2 shows that a hyperlink is extended from the product "PC system" listed on the home page 201 exclusive to the customer to the home page 202 of the product. The home page 202 in turn manages the customer number for returning to the home page 201 exclusive to the customer, as well as part names of component parts which comprise the product, product numbers or product lot numbers, from which hyperlinks are extended. In the shown example, the home page 202 manages the component parts of "PC system" as CPU, HDD, CD-ROM and so on, with their names and product numbers. Likewise, from these component parts CPU, HDD, CD-ROM and so on, hyperlinks similar to the foregoing are extended. The destinations of the links are home pages in servers of the part manufacturers which provide the component parts for the product.

The shown example includes a home page 203 which resides in the server of a part manufacture which supplies HDD, a component part of the product "PC system." The home page 203 manages the product name and product number for returning to the home page 202 of the associated product, as well as the part names and product numbers or product lot numbers of component parts which comprise the HDD that forms part of the product "PC system." Hyperlinks are also extended from these items associated with the component parts of the HDD. In the shown example, the home page 203 indicates that the HDD is comprised of DISK, HEAD and so on. Though not shown herein, hyperlinks similar to the foregoing are also extended from these component parts DISK, HEAD and so on. The destinations of the links are home pages in servers of lower part manufacturers which provide the component parts for the parts.

The home pages mutually linked through the hyperlinks can be utilized by a customer or a final user. As described above, the customer can acquire service information on a product possessed by him, or acquire service information such as version-up information on a certain part. Likewise, the operator can access and utilize the home pages from his operator terminal 13.

This embodiment permits connections, through hyperlinks, of home pages created for respective products as mentioned above with home pages created for respective parts which comprise individual products, thereby enabling the product configurations to be managed for each of parts which comprise each product, from the manufacturing to disposal of the product. In the following, the management of the product configuration according to this embodiment of the present invention will be described in detail.

Figure 3:
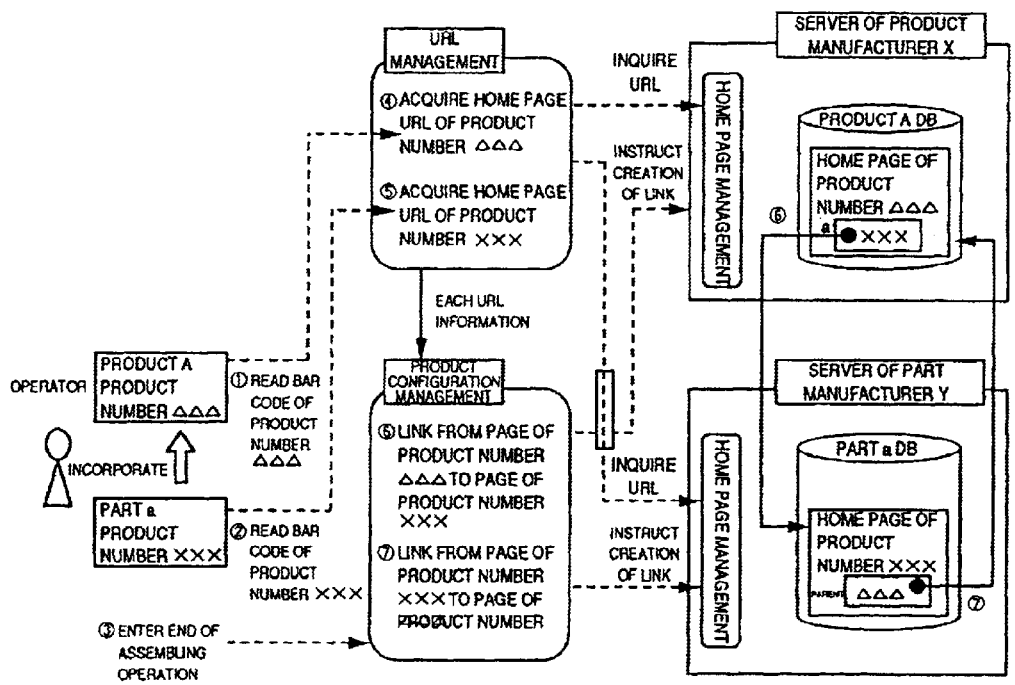
FIG. 3 is a diagram for explaining a process performed when a part a is incorporated in a certain product A.
Figure 4:
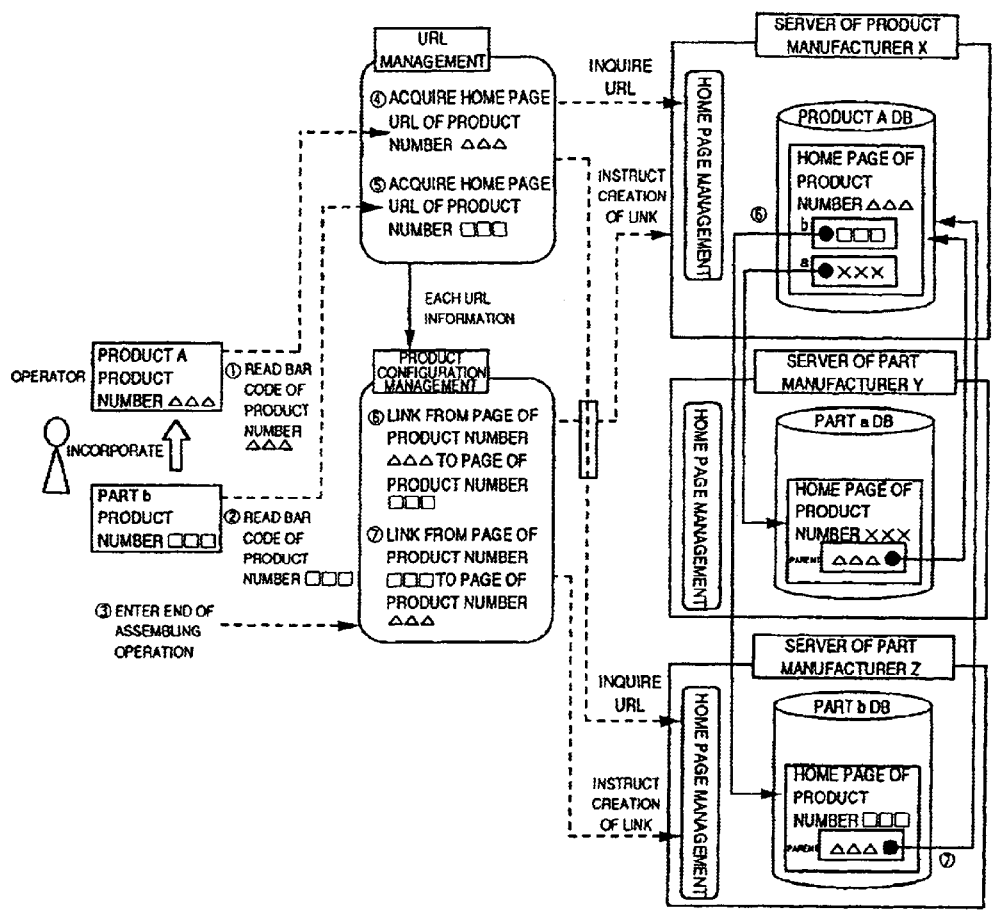
FIG. 4 is a diagram for explaining a process performed when a part b is further incorporated in the product A after the part a has been incorporated therein.
Figure 5:
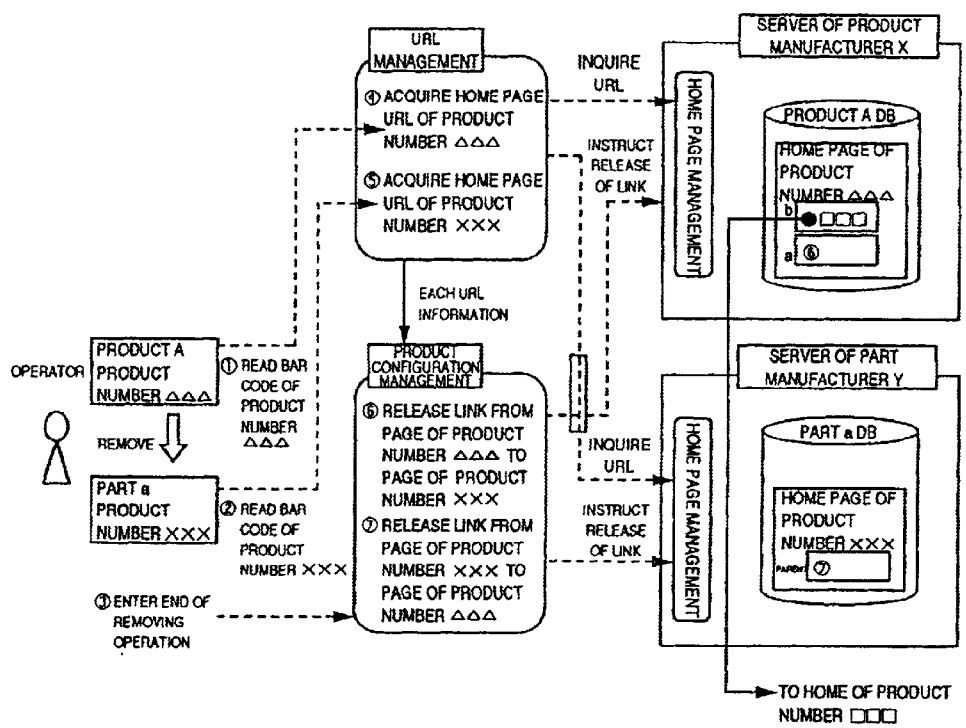
FIG. 5 is a diagram for explaining a process performed when the part a is removed from a product A.
Figure 6:
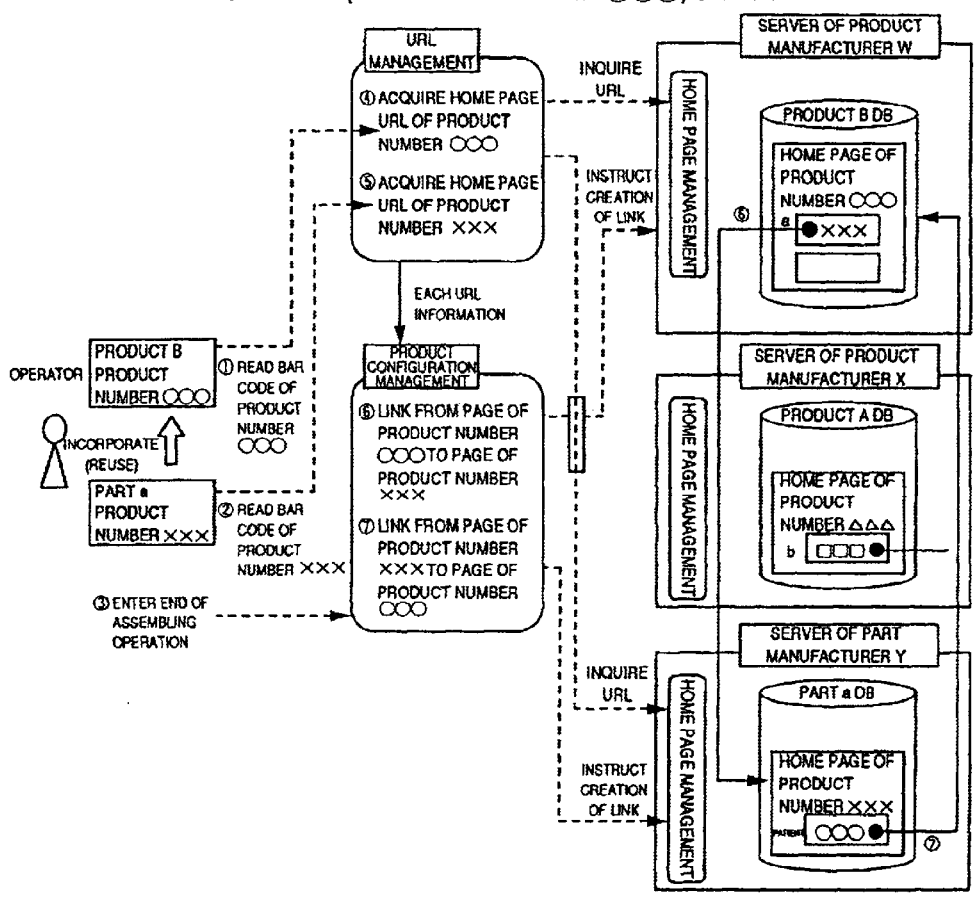
FIG. 6 is a diagram for explaining a process performed when the part a removed from the product A in the process of FIG. 5 is incorporated in a product B.

FIGS. 3, 4 are diagrams for explaining a process performed when parts a, b are incorporated in a certain product A in order; FIG. 5 is a diagram for explaining a process performed when the part a is removed from the product A; and FIG. 6 is a diagram for explaining a process performed when the part a removed in the process of FIG. 5 is incorporated in a product B. In the following, these processes will be explained with reference to the figures. In examples explained below, assume that after a product has been sold to a customer, an operator of the product manufacturer or an operator of a company engaged in repairs and so on performs mounting, removal and so on of parts with the product, in response to a request from the customer. Assume, therefore, that at the time these processes are started, a home page has been created for the product within the server of the product manufacturer at a stage at which the product was manufactured at the product manufacturer, in a manner similar to the processes explained below with reference to FIGS. 3, 4, home pages have been created for component parts of the product within the servers of the respective part manufacturers which supply the parts, and these home pages have been linked to one another through hyperlinks. Assume also that in the example explained below, each of the product and the parts comprising the product is inscribed with its product number in the form of bar code.

Referring first to FIG. 3, the operator reads a bar code representation of the product number ΔΔΔ of the product A at the beginning of the operation, reads a bar code representation of the product number X X X of a part a which is to be incorporated in the product A, and transmits the product numbers to the product configuration management service station 14 (①, ②). Then, when the operator has completed the operation involved in incorporating the part a, the operator reports the product configuration management service station 14 to that effect (③). A URL management unit implemented in the service function unit 142 of the product configuration management service station 14 inquires the server of the product manufacturer and the server of the part manufacture about URLs of the respective home pages with reference to the product number ΔΔΔ of the product A and the product number X X X of the part a sent from the operator terminal 13 at ①, ②, and passes the acquired URLs to a product configuration management unit implemented in the service function unit 142 (④, ⑤) The product configuration management unit accesses the home page of the product number ΔΔΔ of the product A based on the report on the completion of the incorporating operation for the part a, transmitted from the operator terminal at ③ and the URLs of the home pages passed at ④, ⑤, forcing the server of the product manufacturer to register the product number X X X of the part a in the home page of the product number ΔΔΔ as a component part and to create a link to the home page of the product number X X X of the part a. Also, the product configuration management unit accesses the home page of the product number X X X of the part a, forcing the server of the part manufacturer of the part a to register in the home page that the product in which the part is incorporated has a product number ΔΔΔ and to create a link to the home page of the product number ΔΔΔ (⑥, ⑦)

As a result of the process described above, the home page of the product number ΔΔΔ of the product A in the server of the product manufacturer has registered the fact that the part a having the product number X X X has been incorporated as a component part of the product, and creates a link to the home page of the part. Also, the home page of the product number X X X of the part a in the server of the part manufacturer has registered therein that the product in which the part has been incorporated has the product number ΔΔΔ, and created a link to the home page of the product number ΔΔΔ.

After the part a has been incorporated in the product A in the manner described above, assume that a part b is additionally incorporated in the product A. Assuming in this event that the part b is provided from a part manufacturer different from that of the part a, a process involved in the incorporation of the part b will be explained with reference to FIG. 4. The process explained below is basically progressed similarly to the process of FIG. 3. Here, since the part b has a product number □□□, a URL management unit implemented in the service function unit 142 of the product configuration management service station 14 inquires a server of the part manufacturer of the part b at the aforementioned ⑤ about URL of the home page, forcing the server of the part manufacturer of the part b to register at ⑦ that the product in which the part is to be incorporated has the product number ΔΔΔ and to create a link to the home page of the product number ΔΔΔ.

As a result of the process described above, the home page of the product number ΔΔΔ of the product A in the server of the product manufacturer has registered therein the part b having the product number □□□ in addition to the fact that the part a having the product number X X X has been incorporated as a component part of the product, and created a link to the home page of the part b. Also, the home page of the product number □□□ of the part b in the server of the part manufacturer has registered therein that the product in which the part has been incorporated has the product number ΔΔΔ, and created a link to the home page of the product number ΔΔΔ.

Next, referring to FIG. 5, explanation will be given of a process performed when the part a is removed from the product A in which the part a and part b have been incorporated by the foregoing processes.

In this process, the processing at ①, ② and ④, ⑤ is performed in the same manner as described in connection with FIG. 3. Then, the operator reports the product configuration management unit of the product configuration management service station 13 that the part a has been removed from the product A in the processing at ③. Upon receipt of the report, the product configuration management unit accesses the home page of the product number ΔΔΔ of the product A based on the URLs of the home pages passed at ④, ⑤, deletes the product number X X X of the part a registered in the home page of the product number ΔΔΔ, forcing the server of the product manufacturer to release the link to the home page of the product number X X X of the part a. The product configuration management unit also accesses the home page of the product number X X X of the part a, forcing the server of the part manufacturer of the part a to delete therefrom the registered fact that the product in which the part is incorporated has the product number ΔΔΔ and to delete the link to the home page of the product number ΔΔΔ (⑥, ⑦).

As a result of the process described above, the home page of the product number ΔΔΔ of the product A in the server of the product manufacturer has registered only the part b having the product number □□□ as a component part of the product, and has a link established to the home page of the part b. On the other hand, from the home page of the product number X X X of the part a, the information on the home page of the product number ΔΔΔ of the product A has been deleted. The link to the home page of the product number ΔΔΔ has also been deleted.

Next, referring to FIG. 6, explanation will be given of a process performed when the part a removed by the foregoing process in FIG. 5 is incorporated in a product B. This process is provided for reusing the part a. In an example explained below, the product B is manufactured by a product manufacturer W different from the product manufacturer X which provides the product A. Since the process in FIG. 6 is completely identical to the process previously explained in connection with FIG. 3 only except that the home page of the product number ΔΔΔ of the product A, which is a home page in the server of the product manufacturer X of the product A, is replaced with a home page of a product number ○○○ of the product B, which is a home page in a server of the product manufacturer W of the product B, explanation on the specific processing is omitted.

Figure 7:
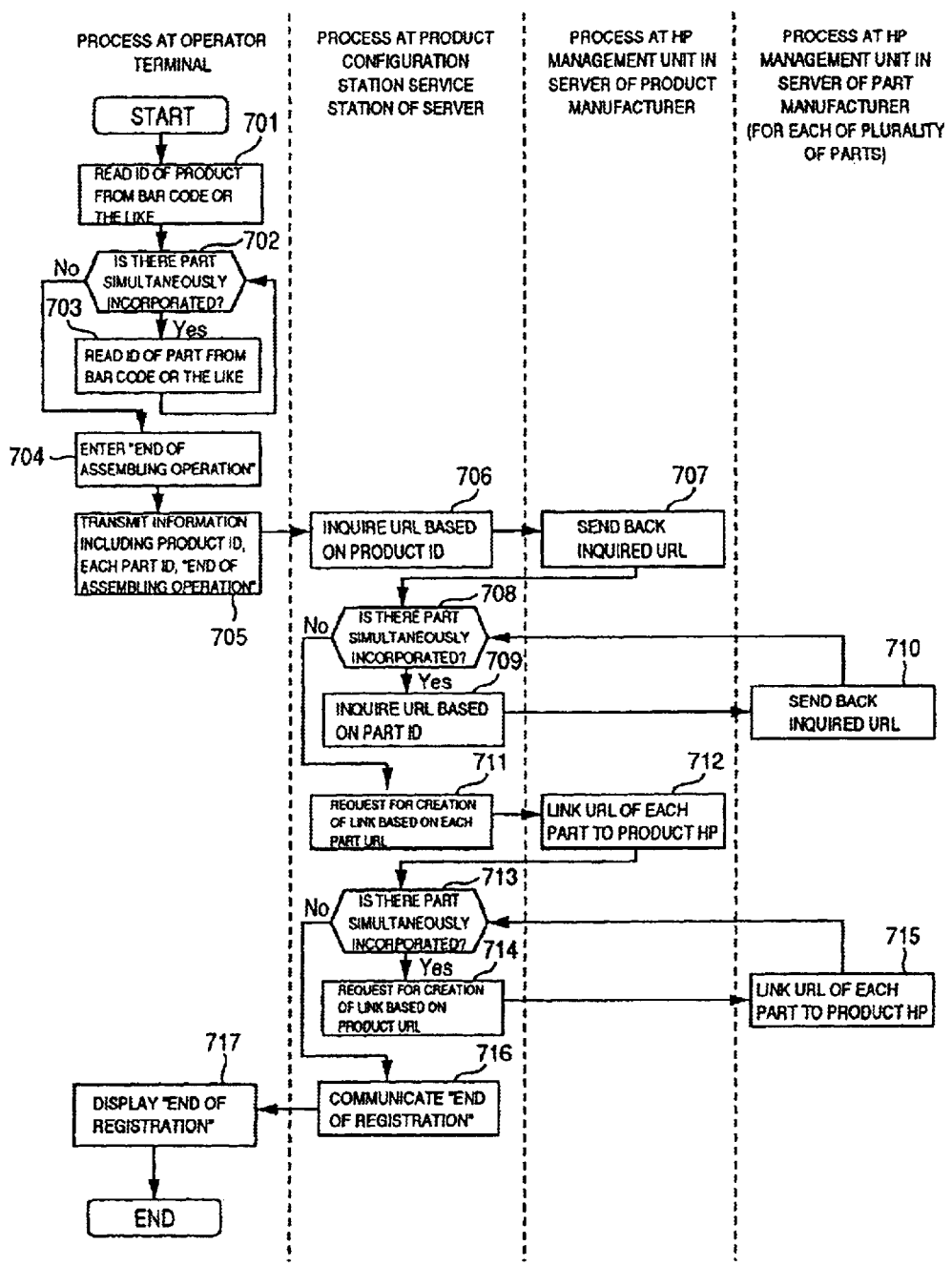
FIG. 7 is a flow chart for explaining a process of operations performed at each of associated servers when a part is incorporated in a product.

FIG. 7 is a flow chart for explaining a process of operations performed at each of associated servers when a part is incorporated in a product. In the following, this process will be explained. The flow shown herein illustrates the processes previously explained in connection with FIGS. 3, 4.

(1) The operator reads a bar code representation of the product ID including the product number of a product, at the beginning of the operation, and checks whether or not a part should be incorporated in the product. If this check shows that any part should be incorporated, the operator reads a bar code representation of a part ID which includes the product number of the part to be incorporated. The reading is performed for all of parts which should be incorporated (steps 701–703).

(2) After incorporating all the parts to be incorporated in the product, the operator enters "end of assembling operation" and transmits information including the product ID, respective part IDs, and "end of assembling operation" from the operator terminal to the product configuration management service station (steps 704, 705).

(3) The product configuration management service station inquires a home page management unit of the product manufacturer about URL of the home page of the product, based on the received product ID, and receives a response to the inquiry (steps 706, 707).

(4) Subsequently, the product configuration management service station checks whether or not a part should be incorporated. If this check shows that any part should be incorporated, the product configuration management service station inquires a home page management unit of a part manufacturer about URL of a home page of the part, and receives a response to the inquiry. This processing is performed for all of parts which should be incorporated (steps 708–710).

(5) The product configuration management service station first requests the home page management unit of the product manufacturer, based on the URLs of the home pages of the respective parts, to register the parts incorporated in the product in the home page of the product and to create links to the home pages of the respective parts, forcing the home page management unit of the product manufacturer to register the parts in its home page and to create links to the home pages of the respective parts (steps 711, 712).

(6) Subsequently, the product configuration management service station checks whether or not a part should be incorporated. If this check shows that any part should be incorporated, the product configuration management service station requests the home page management unit of the part manufacturer, based on the URL of the home page of the product, to register product information and to create a link to the home page of the product, forcing the part manufacturer to register the product in the home page and to create a link to the home page of the product. This processing is performed for all of parts which should be incorporated (steps 713–715).

(7) After completing the process up to step 715, the product configuration management service station transmits "end of registration" to the operator terminal which then receives the "end of registration" for display on the terminal, followed by the termination of a sequence of processing (steps 716, 717).

Figure 8:
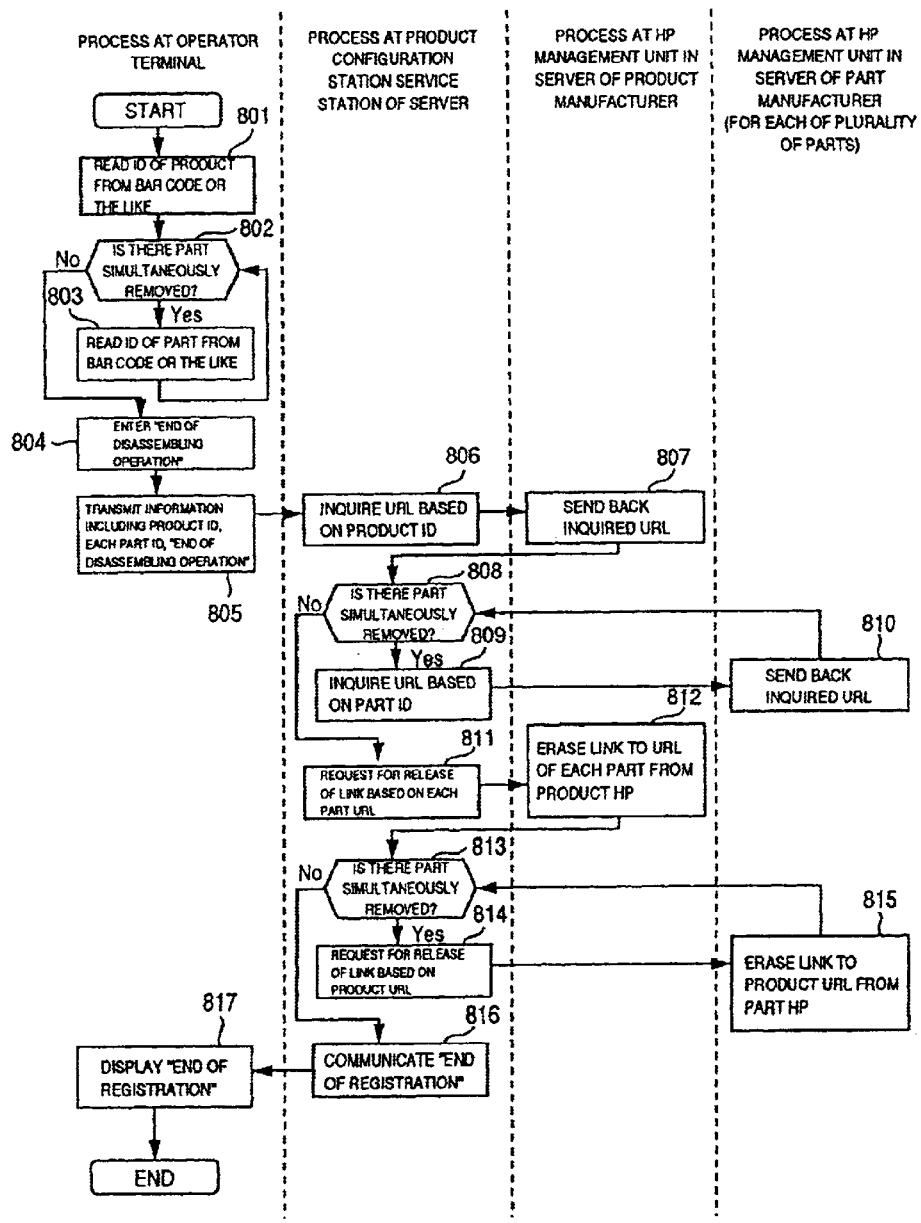
FIG. 8 is a flow chart for explaining a process of operations performed at each of associated servers when a part is removed from a product.

FIG. 8 is a flow chart for explaining a process of operations performed at each of associated servers when a part is removed from a product. In the following, this process will be explained. The flow shown herein illustrates the process previously explained in connection with FIG. 5.

(1) The operator reads a bar code representation of product ID including the product number of a product, at the beginning of the operation, and checks whether or not a part should be removed from the product. If this check shows that any part should be removed, the operator reads a bar code representation of a part ID which includes the product number of the part to be removed. The reading is performed for all of parts which should be removed (steps 801–803).

(2) After removing all the parts to be removed from the products, the operator enters "end of disassembling operation" and transmits information including the product ID, respective part IDs, and "end of disassembling operation" from the operator terminal to the product configuration management service station (steps 804, 805).

(3) The product configuration management service station inquires a home page management unit of the product manufacturer about URL of the home page of the product, based on the received product ID, and receives a response to the inquiry (steps 806, 807).

(4) Subsequently, the product configuration management service station checks whether or not a part should be removed. If this check shows that any part should be removed, the product configuration management service station inquires a home page management unit of a part manufacturer about URL of a home page of the part, and receives a response to the inquiry. This processing is performed for all of parts which should be removed (steps 808–810).

(5) The product configuration management service station first requests the home page management unit of the product manufacturer, based on the URLs of the home pages of the respective parts, to delete the registration of the parts removed from the product from the home page of the product and to delete links to the home pages of the respective parts, forcing the home page management unit of the product manufacturer to delete the parts in its home page and to erase links to the home pages of the respective parts (steps 811, 812).

(6) Subsequently, the product configuration management service station checks whether or not a part should be removed. If this check shows that any part should be removed, the product configuration management service station requests the home page management unit of the part manufacturer, based on the URL of the home page of the product, to delete product information and to delete a link to the home page of the product, forcing the home page management unit of the part manufacturer to delete the product registered in its home page and to erase a link to the home page of the product. This processing is performed for all of parts which should be deleted (steps 813–815).

(7) After completing the process up to step 815, the product configuration management service station transmits "end of disassembly registration" to the operator terminal which then receives the end of disassembly registration for display on the terminal, followed by the termination of a sequence of processing (steps 816, 817).

Figure 9:
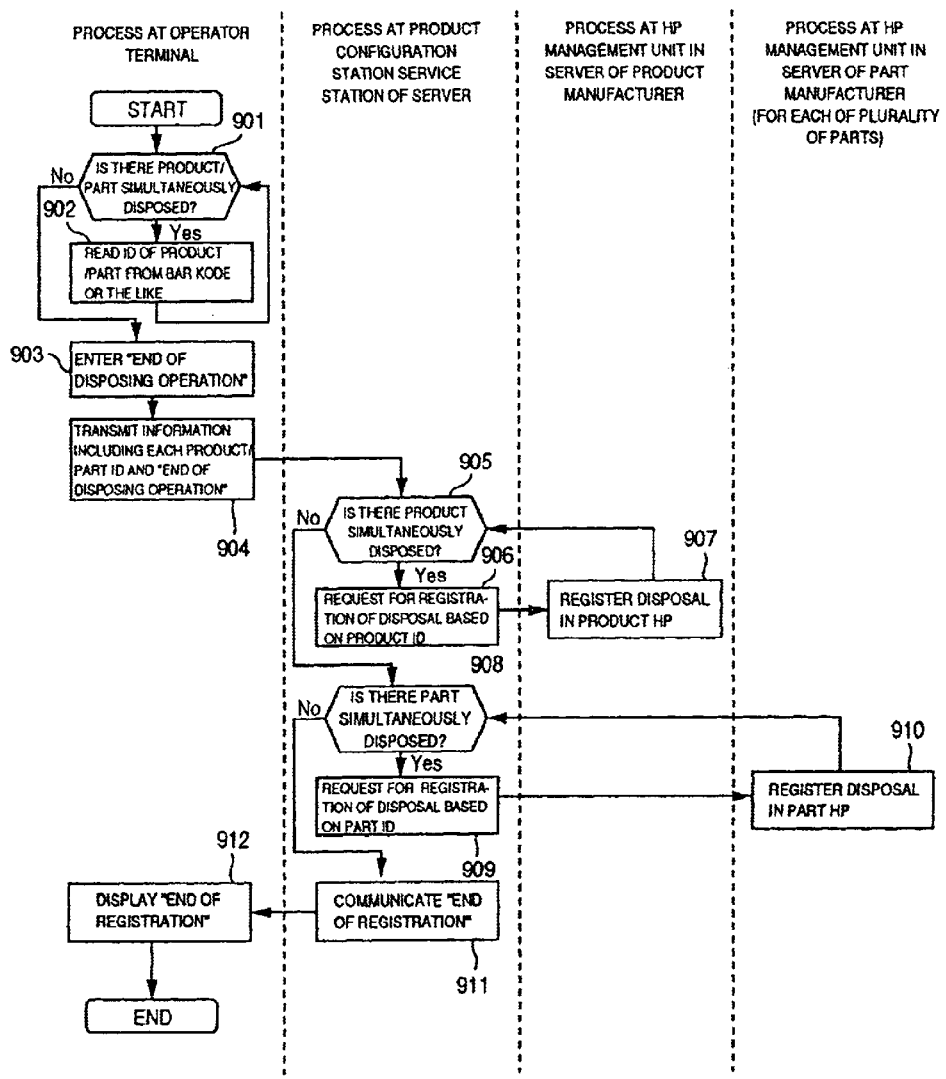
FIG. 9 is a flow chart for explaining a process of operations performed at each of associated servers when a part removed from a product and/or a disassembled product is disposed.

FIG. 9 is a flow chart for explaining a process of operations performed at each of associated servers when a part removed from a product and/or a disassembled product is disposed. In the following this process will be explained.

(1) The operator checks at the beginning of the operation whether or not a part or product should be disposed, and if any part or product should be disposed, reads a bar code representation of a product ID including the product number of the product or part to be disposed. The reading is performed for all of products and parts which should be disposed (steps 901–902).

(2) After disposing all the products and parts to be disposed, the operator enters "end of disposing operation" and transmits information including the product IDs, respective part IDs, and "end of disposing operation" from the operator terminal to the product configuration management service station (steps 903, 904).

(3) After receiving the report at step 904, the product configuration management service station checks whether or not a product should be disposed. If this check shows that any product should be disposed, the product configuration management service station requests a home page management unit of a product manufacturer for registration of disposal in the home page of the product, based on the product ID, forcing the home page management unit of the product manufacturer to register the disposal in the home page of the product. This processing is performed for all of products which should be disposed (steps 905–907).

(4) Next, the product configuration management service station checks whether or not a part should be disposed. If this check shows that any part should be disposed, the product configuration management service station requests the home page management unit of the part manufacturer, based on the part ID, to register the disposal in the home page of the part, forcing the home page management unit of the product manufacturer to register the disposal in the home page of the part. This processing is performed for all of parts which should be deleted (steps 908-910).

(5) After completing the process up to step 910, the product configuration management service station transmits "end of disposal registration" to the operator terminal which then receives the "end of disposal registration" for display on the terminal, followed by the termination of a sequence of processing (steps 911, 912).

Figure 10:
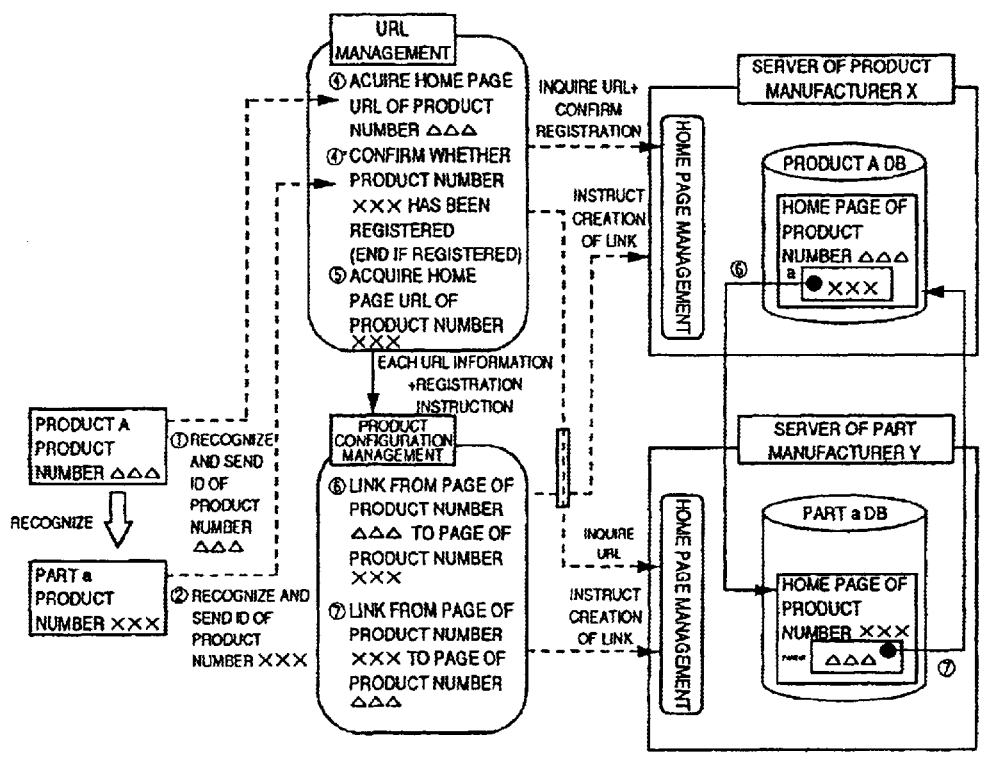
FIG. 10 is a diagram for explaining another example of the process performed when a part a is incorporated in a certain product A.
Figure 11:
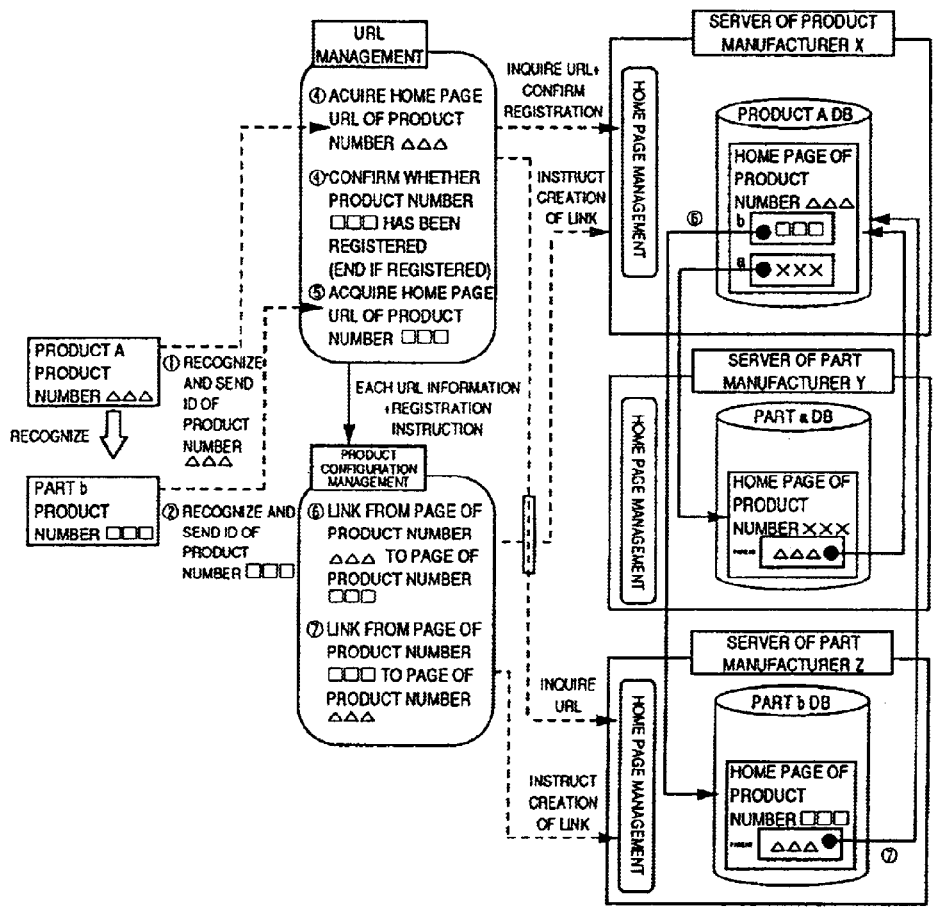
FIG. 11 is a diagram for explaining another example of the process performed when a part b is incorporated in the product A after the part a has been incorporated therein.
Figure 12:
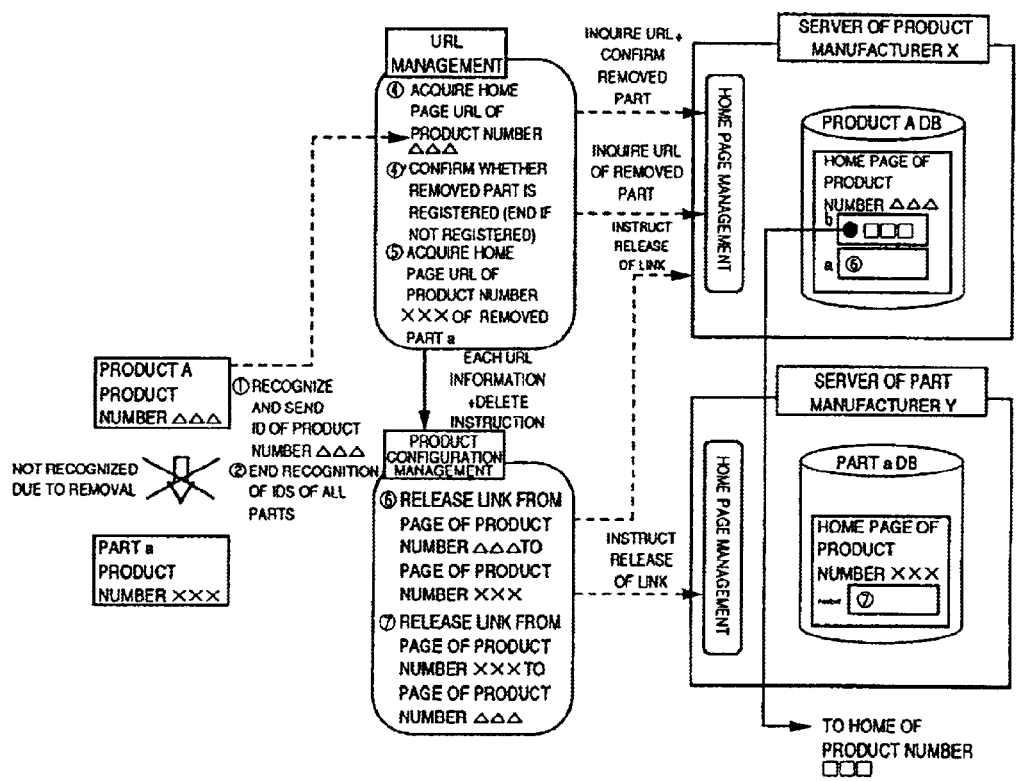
FIG. 12 is a diagram for explaining another example of the process performed when the part a is removed from the product A.
Figure 13:
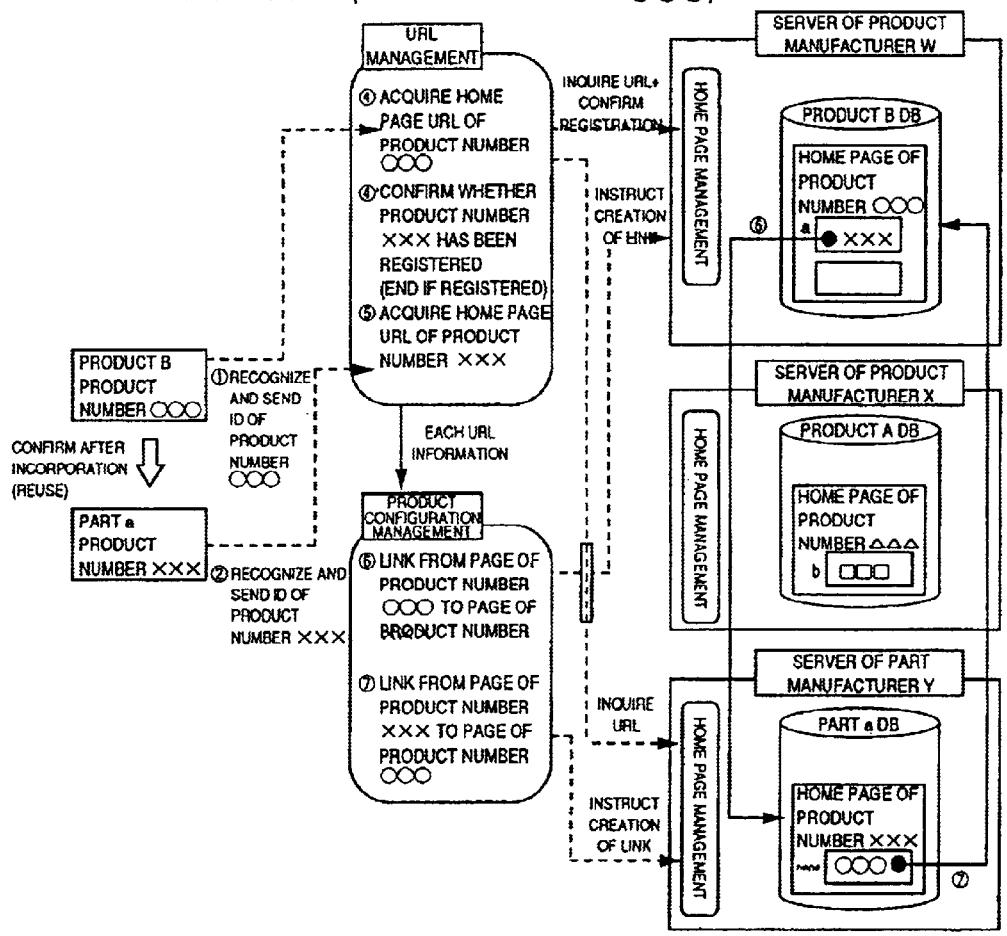
FIG. 13 is a diagram for explaining another example of the process performed when the part a removed from the product A in the process of FIG. 12 is incorporated in a product B.

FIGS. 10, 11 are diagrams for explaining another example of the process performed when parts a, b are incorporated in a certain product A in order; FIG. 12 is a diagram for explaining another example of the process performed when the part a is removed from the product A; and FIG. 13 is a diagram for explaining another example of the process performed when the part a removed in the process of FIG. 12 is incorporated in a product B. In the following, these processes will be explained with reference to the figures. Similarly to the processes explained in connection with FIGS. 3 to 6, in the examples explained below, assume that after a product has been sold to a customer, an operator of the product manufacturer or an operator of a company engaged in repairs and so on performs mounting, removal and so on of parts with the product in response to a request from the customer. Assume, therefore, that at the time these processes are started, a home page has been created for the product within the server of the product manufacturer at a stage at which the product was manufactured at the product manufacturer, in a manner similar to the processes explained above with reference to FIGS. 3, 4, home pages have been created for component parts of the product within the servers of the respective part manufacturers which supply the parts, and these home pages have been linked to one another through hyperlinks. Assume also that in the examples explained below, the product itself is configured to have the ability of recognizing its own ID and IDs of respective parts which comprise the product.

Referring first to FIG. 10, assume that the operator has incorporated a part a having a product number X X X in a product A having a product number ΔΔΔ. After the incorporation of the part a, the product A recognizes its own ID having the product number ΔΔΔ, and also recognizes the ID of the part a having the product number X X X. Then, the product A transmits these IDs to the product configuration management service station 14 (①, ②). The URL management unit implemented in the service function unit 142 of the product configuration management service station 14 acquires URL of a home page of the product number ΔΔΔ of the product A based on the IDs transmitted from the product A at ①, ②, inquires the server of the product manufacturer about URL, and confirms whether or not the incorporated part a having the product number X X X has already been registered in the home page of the product. If the part a having the product number X X X has already been registered in the home page, the process is terminated ((④), (④)'). If the incorporated part a having the product number has not been registered in the home page of the product number X X X of the part a, the URL management unit passes information including the URL of the home page of the product number ΔΔΔ of the product A, the URL of the home page of the product number X X X of the part a, and an instruction to register the part a to the product configuration management unit implemented in the service function unit 142 (⑤). The product configuration management unit accesses the home page of the product number ΔΔΔ of the product A based on the received information, and instructs the server of the product manufacturer to register the product number X X X of the part a in the home page of the product number ΔΔΔ as a component part and to create a link to the home page of the product number X X X of the part a. Also, the product configuration management unit accesses the home page of the product number X X X of the part a, and instructs the server of the part manufacturer of the part a to register in the home page that the product in which the part is incorporated has a product number ΔΔΔ and to create a link to the home page of the product number ΔΔΔ (⑥, ⑦). The processing at ⑥, ⑦ are identical to that previously explained in connection with FIG. 3.

As a result of the process described above, the home page of the product number ΔΔΔ of the product A in the server of the product manufacturer has registered the fact that the part a having the product number X X X has been incorporated as a component part of the product, and created a link to the home page of the part. Also, the home page of the product number X X X of the part a in the server of the part manufacturer has registered that the product in which the part has been incorporated has the product number ΔΔΔ, and created a link to the home page of the product number ΔΔΔ.

After the part a has been incorporated in the product A in the manner described above, assume that a part b is additionally incorporated in the product A. Assuming in this event that the part b is provided from a part manufacturer different from that of the part a, a process involved in the incorporation of the part b will be explained with reference to FIG. 11. The process explained below is basically progressed similarly to the process of FIG. 3. Here, since the part b has a product number □□□, the instruction issued at the aforementioned ⑤ to incorporate is made to the part b, and the server of the part manufacturer, which supplies the part b, is instructed at ⑦ to register that the product in which the part is to be incorporated has the product number ΔΔΔ and to create a link to the home page of the product number ΔΔΔ.

As a result of the process described above, the home page of the product number ΔΔΔ of the product A in the server of the product manufacturer has registered the part b having the product number □□□ in addition to the fact that the part a having the product number X X X has been incorporated as a component part of the product, and created a link to the home page of the part b. Also, the home page of the product number □□□ of the part b in the server of the part manufacturer has registered that the product in which the part has been incorporated has the product number ΔΔΔ, and created a link to the home page of the product number ΔΔΔ.

Next, referring to FIG. 12, explanation will be given of a process performed when the part a is removed from the product A in which the part a and part b have been incorporated by the foregoing processes.

In FIG. 12, assume that the operator has removed the part a having the product number X X X from the product A having the product number ΔΔΔ. After the removal of the part a, the product A recognizes its own ID having the product number ΔΔΔ, and also recognizes the ID of the part which has been incorporated at this time (since the part a has been removed, its ID cannot be recognized). Then, the product A transmits these IDs to the product configuration management service station 14 (①, ②) The URL management unit implemented in the service function unit 142 of the product configuration management service station 14 acquires the URL of the home page of the product number ΔΔΔ of the product A based on the IDs transmitted from the product A at ①, ②, inquires the server of the product manufacturer about the URL, and confirms whether or not the removed part is registered in the home page of the product. If the removed part is not registered, the process is terminated (④, ④'). If the removed part is registered (when parts registered in the home page of the product include a part which is not associated with a current inquiry), the URL management unit acquires the URL of the home page of the product number X X X of the part a, and passes information including the URL of the home page of the product number ΔΔΔ of the product A, the URL of the home page of the product number X X X of the part a, and an instruction to remove the part a to the product configuration management unit implemented in the service function unit 142 (⑤). The product configuration management unit accesses the home page of the product number ΔΔΔ of the product A based on the received information, and instructs the server of the product manufacturer to delete the product number of the part a registered in the home page of the product number ΔΔΔ and to release a link to the home page of the product number X X X of the part a. Also, the product configuration management unit accesses the home page of the product number X X X of the part a, and instructs the server of the part manufacturer of the part a to delete therefrom the registered fact that the product in which the part is incorporated has the product number ΔΔΔ and to delete the link to the home page of the product number ΔΔΔ (⑥, ⑦). The processing at ⑥, ⑦ are identical to that previously explained in connection with FIG. 5.

As a result of the process described above, the home page of the product number ΔΔΔ of the product A in the server of the product manufacturer has registered only the part b having the product number □□□ as a component part of the product A, and has a link established to the home page of the part b. On the other hand, from the home page of the product number X X X of the part a, the information on the home page of the product number ΔΔΔ of the product A has been deleted. The link to the home page of the product number ΔΔΔ has also been deleted.

Next, referring to FIG. 13, explanation will be given of a process performed when the part a removed by the foregoing process in FIG. 12 is incorporated in a product B. This process is provided for reusing the part a. In an example explained below, the product B is manufactured by a product manufacturer W different from the product manufacturer X which provides the product A. Since the process in FIG. 13 is completely identical to the process previously explained in connection with FIG. 10 only except that the home page of the product number ΔΔΔ of the product A, which is a home page in the server of the product manufacturer X of the product A, is replaced with a home page of a product number ◯◯◯ of the product B, which is a home page in a server of the product manufacturer W of the product B, explanation on the specific processing is omitted.

Figure 14:
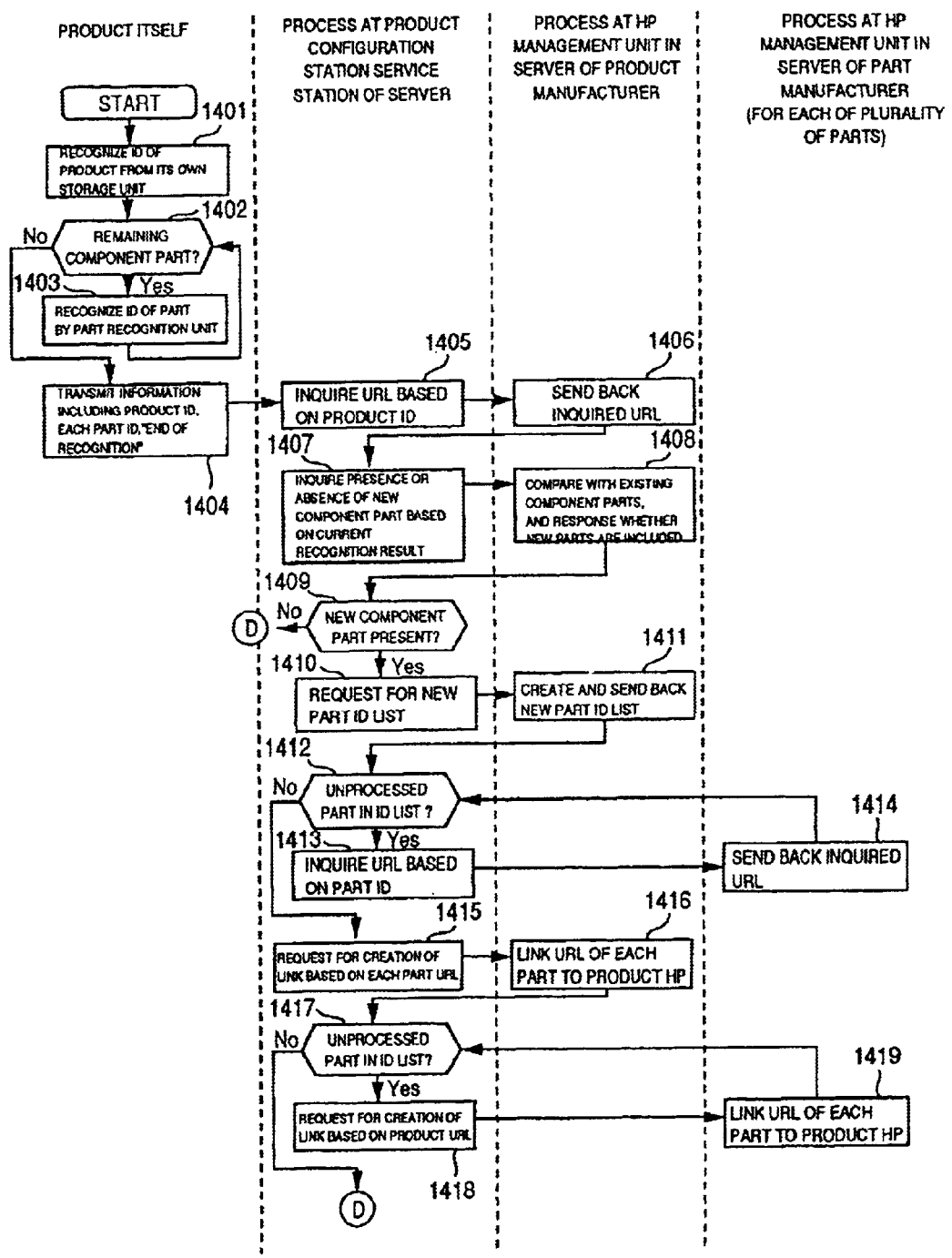
FIG. 14 is a flow chart (1) for explaining a process performed at each of associated servers when a part is incorporated in or removed from a product.
Figure 15:
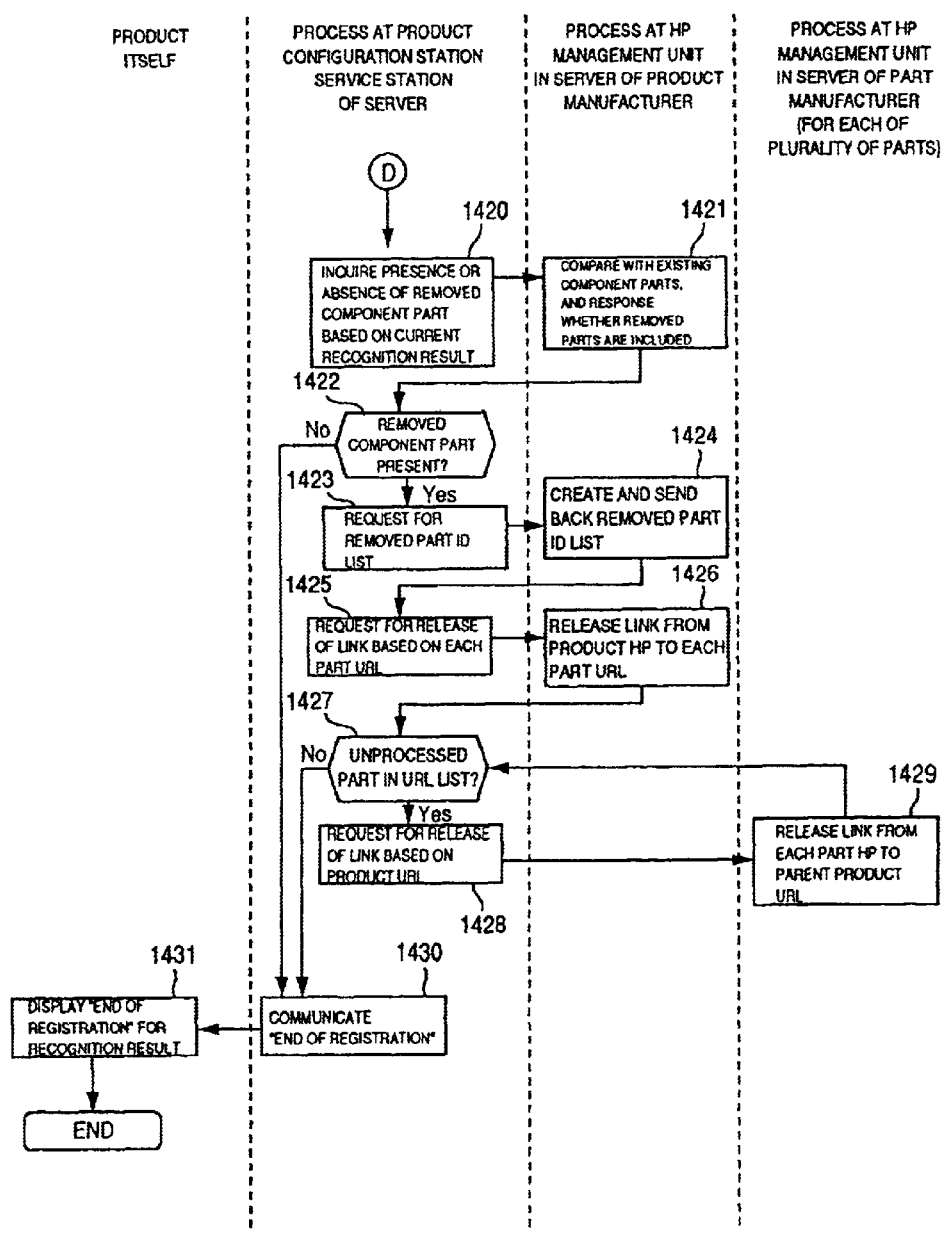
FIG. 15 is a flow chart (2) for explaining a process performed at each of associated servers when a part is incorporated in or removed from a product.

FIGS. 14, 15 are flow charts for explaining processes of operations performed at each of associated servers when a part is incorporated in or removed from a product. The flow shown herein illustrates the processes previously explained in connection with FIGS. 10 to 13. In the following, these processes will be explained. These processes are started after the operator has incorporated a part in a product or removed a part from a product.

(1) The product recognizes its own product ID from its storage unit, and checks whether or not a part has been incorporated therein. If any part has been incorporated, a part recognition unit recognizes ID of the incorporated part. This part ID recognition processing is performed for all of parts which have been incorporated. The product transmits information including the recognized product ID and part IDs as well as "completion of ID recognition" to the product configuration management service station (steps 1401–1404).

(2) The product configuration management service station inquires the server of the product manufacturer about URL, based on the product ID sent from the product, and receives information on the URL from the server of the product manufacturer. Also, the product configuration management service station inquires the server of the product manufacturer, based on the part IDs resulting from the current recognition, whether or not any new component parts have been included in the product (steps 1405–1407).

(3) Since the server of the product manufacturer, in response to the inquiry at step 1407, compares information on existing component parts present in the home page with information on parts included in the information of the inquiry, and sends back a response as to the presence or absence of new parts, the product configuration management service station receives the response, and checks whether or not any new component parts have been included from the information in the received response as to the presence or absence of new parts. If included, the product configuration management service station requests the server of the product manufacturer for an ID list of the new parts (steps 1408–1410).

(4) Since the server of the product manufacturer sends back the ID list of the new parts in response to the request at step 1410, the product configuration management service station receives the ID list, and checks whether or not an unprocessed part is included in the ID list (steps 1411, 1412).

(5) If any unprocessed part is found in the check at step 1412, the product configuration management service station inquires a server of a part manufacturer of the unprocessed part about URL of the part, based on the part ID, and receives a response, from the server of the part manufacturer, which includes the URL of the home page of the part. The request for the home page URL of the part and the reception of the URL are performed for all of unprocessed parts in the ID list (steps 1413, 1414).

(6) The product configuration management service station requests the server of the product manufacturer, based on the URLs of the respective parts received from the servers of the part manufacturers, to register new parts in the home page of the associated product and to create links from the home page of the product to the home pages of the parts, forcing the server of the product manufacturer to create links from the home page of the product to the home pages of the parts (step 1415, 1416).

(7) The product configuration management service station checks whether or not an unprocessed part is included in the ID list. If there is any unprocessed part, the product configuration management service station requests a server of a part manufacturer of the unprocessed part, based on the URL of the product, to register the product in the home page of the part and to create a link from the home page of the part to the home page of the product, forcing the server of the part manufacturer to create a link from the home page of the part to the home page of the product. This processing is performed for all of unprocessed parts in the ID list (steps 1417–1419).

(8) If the check at step 1409 shows that no new component parts are included, or if the check at step 1417 that no unprocessed parts are found in the part ID list, the product configuration management service station inquires the server of the product manufacturer whether or not any component parts have been removed from the product, based on the part IDs resulting from the current recognition (step 1420).

(9) Since the server of the product manufacturer, in response to the inquiry at step 1420, compares information on existing component parts present in the home page with information on parts included in the information of the inquiry, and sends back a response as to the presence or absence of removed parts, the product configuration management service station receives the response, and checks whether or not any removed component parts have been included from the information in the received response as to the presence or absence of removed parts. If included, the product configuration management service station requests the server of the product manufacturer for a URL list of the removed parts (steps 1421–1423).

(10) Since the server of the product manufacturer sends back the URL list of the removed parts in response to the request at step 1423, the product configuration management service station receives the URL list, and requests the server of product manufacturer, based on the URLs of the respective parts, to release a link from the home page of the product to a home page of each part, forcing the server of the product manufacturer to release a link from the home page of the product to the home page of each part (steps 1424–1426).

(11) The product configuration management service station checks whether or not an unprocessed part is included in the part URL list. If there is any unprocessed part, the product configuration management service station requests a server of a part manufacturer of the unprocessed part, based on the URL of the product, to delete the product in the home page of the part and to release a link from the home page of the part to the home page of the product, forcing the server of the part manufacturer to release a link from the home page of the part to the home page of the product. This processing is performed for all of unprocessed parts in the part URL list (steps 1427–1429).

(12) If the check at step 1422 shows that no removed component parts are included, or if the check at step 1427 shows that no unprocessed parts are found in the URL list, the product configuration management service station transmits "end of registration" to the product. The product, upon receipt of the "end of registration," displays the "end of registration" for the recognition result, followed by the termination of a sequence of processing (step 1430, 1431).

Figure 16:
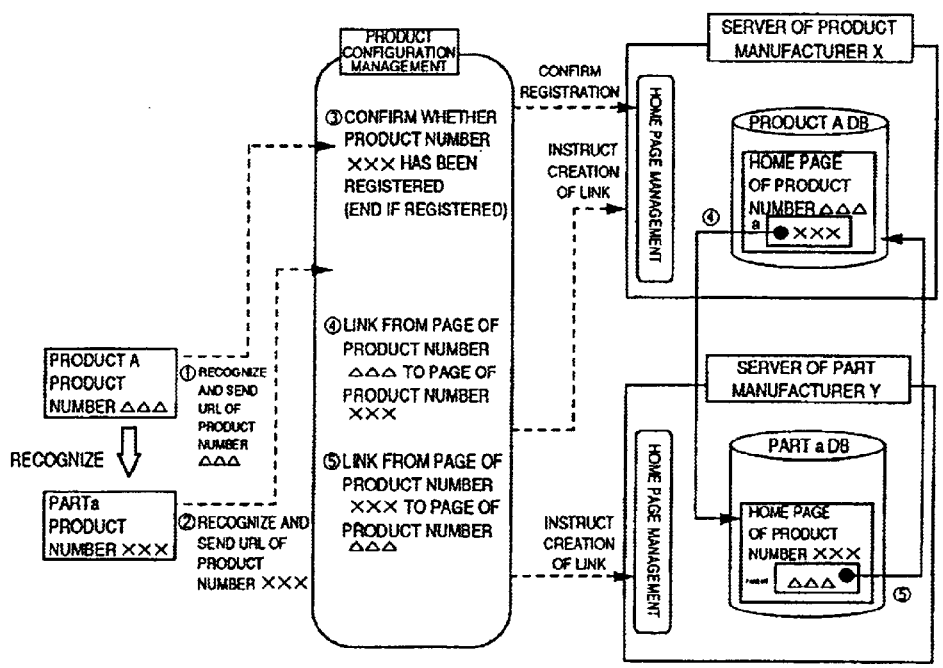
FIG. 16 is a diagram for explaining a further example of the process performed when a part a is incorporated in a certain product A.
Figure 17:
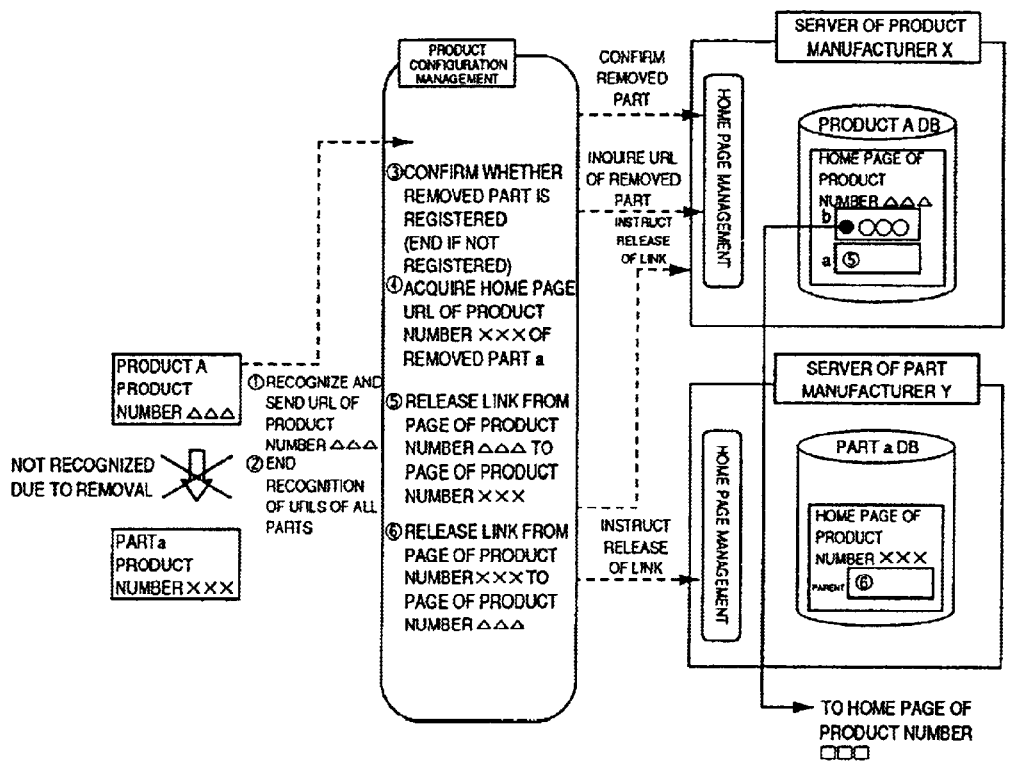
FIG. 17 is a diagram for explaining a further example of the process performed when a part a is removed from a product A.

FIG. 16 is a diagram for explaining a further example of the process performed when a part a is incorporated in a certain product A, and FIG. 17 is a diagram for explaining a further example of the process performed when a part a is removed from a product A. In the following, these processes will be explained with reference to the figures. Similarly to the processes explained in connection with FIGS. 3 to 6, in the examples explained below, assume that after a product has been sold to a customer, an operator of the product manufacturer or an operator of a company engaged in repairs and so on performs mounting, removal and so on of parts with the product in response to a request from the customer. Assume, therefore, that at the time these processes are started, a home page has been created for the product within the server of the product manufacturer at a stage at which the product was manufactured at the product manufacturer, in a manner similar to the processes explained above with reference to FIGS. 3, 4, home pages have been created for component parts of the product within the servers of the part manufacturers which supply the parts, and these home pages have been linked to one another through hyperlinks. Assume also that in the examples explained below, the product itself is configured to have the ability of recognizing URL of its own home page and URLs of home pages of respective parts which comprise the product.

Referring first to FIG. 16, assume that the operator has incorporated a part a having a product number X X X in a product A having a product number ΔΔΔ. After the incorporation of the part a, the product A recognizes URL of its own home page of a product number ΔΔΔ, and also recognizes URL of a home page of the part a having a product number X X X. Then, the product A transmits these URLs to the product configuration management unit of the product configuration management service station 14 (①, ②) The product configuration management unit confirms, with the URLs sent from the product A at ①, ②, whether or not the incorporated part a having the product number X X X has already been registered in the home page of the product number ΔΔΔ of the product A. If the part a having the product number X X X has already been registered in the home page, the process is terminated (③). If the incorporated part a having the product number X X X has not been registered in the home page of the product number X X X of the part a, the product configuration management unit accesses the home page of the product number ΔΔΔ of the product A, and instructs the server of the product manufacturer to register the product number X X X of the part a in the home page of the product number ΔΔΔ as a component part and to create a link to the home page of the product number X X X of the part a. Also, the product configuration management unit accesses the home page of the product number X X X of the part a, and instructs the server of the part manufacturer to register in the home page that the product in which the part is incorporated has the product number ΔΔΔ and to create a link to the home page of the product number ΔΔΔ (④, ⑤). The processing at ④, ⑤ are identical to the processing at ⑥, ⑦ previously explained in connection with FIG. 3.

Next, referring to FIG. 17, explanation will be given of a process performed when the part a is removed from the product A in which the part a had been incorporated by the aforementioned process and a part b having a product number □□□ has also been incorporated by a similar process.

In FIG. 17, assume that the operator has removed the part a having the product number X X X from the product A having the product number ΔΔΔ. After the removal of the part a, the product A recognizes URL of its own home page of the product number ΔΔΔ, and also recognizes URL of a home page of a part which has been incorporated at this time (since the part a has been removed, its URL cannot be recognized). Then, the product A transmits these URLs to the product configuration management unit (①, ②). The product configuration management unit confirms the server of the product manufacturer, with the URLs sent from the product A at ①, ②, whether or not the removed part is registered in the home page of the product having the product number ΔΔΔ. If the removed part is not registered, the process is terminated (③). If the removed part is registered (when parts registered in the home page of the product include a part which is not associated with a current inquiry), the product configuration management unit accesses the home page of the product number ΔΔΔ of the product A based on the received information, and instructs the server of the product manufacturer to delete the product number X X X of the part a registered on the home page of the product number ΔΔΔ and to release a link to the home page of the product number X X X of the part a. Also, the product configuration management unit accesses the home page of the product number X X X of the part a, and instructs the server of the part manufacturer to delete from the home page the registered fact that the product in which the part is incorporated has the product number ΔΔΔ and to delete the link to the home page of the product number ΔΔΔ (④, ⑤). The processing at ④, ⑤ are identical to ⑥, ⑦ previously explained in connection with FIG. 5.

As a result of the process described above, the home page of the product number ΔΔΔ of the product A in the server of the product manufacturer has registered only the part b having the product number □□□ as a component part of the product A, and has a link to the home page of the part b. On the other hand, from the home page of the product number X X X of the part a, the information on the home page of the product number ΔΔΔ of the product A has been deleted. The link to the home page of the product number ΔΔΔ has also been deleted.

Figure 18:
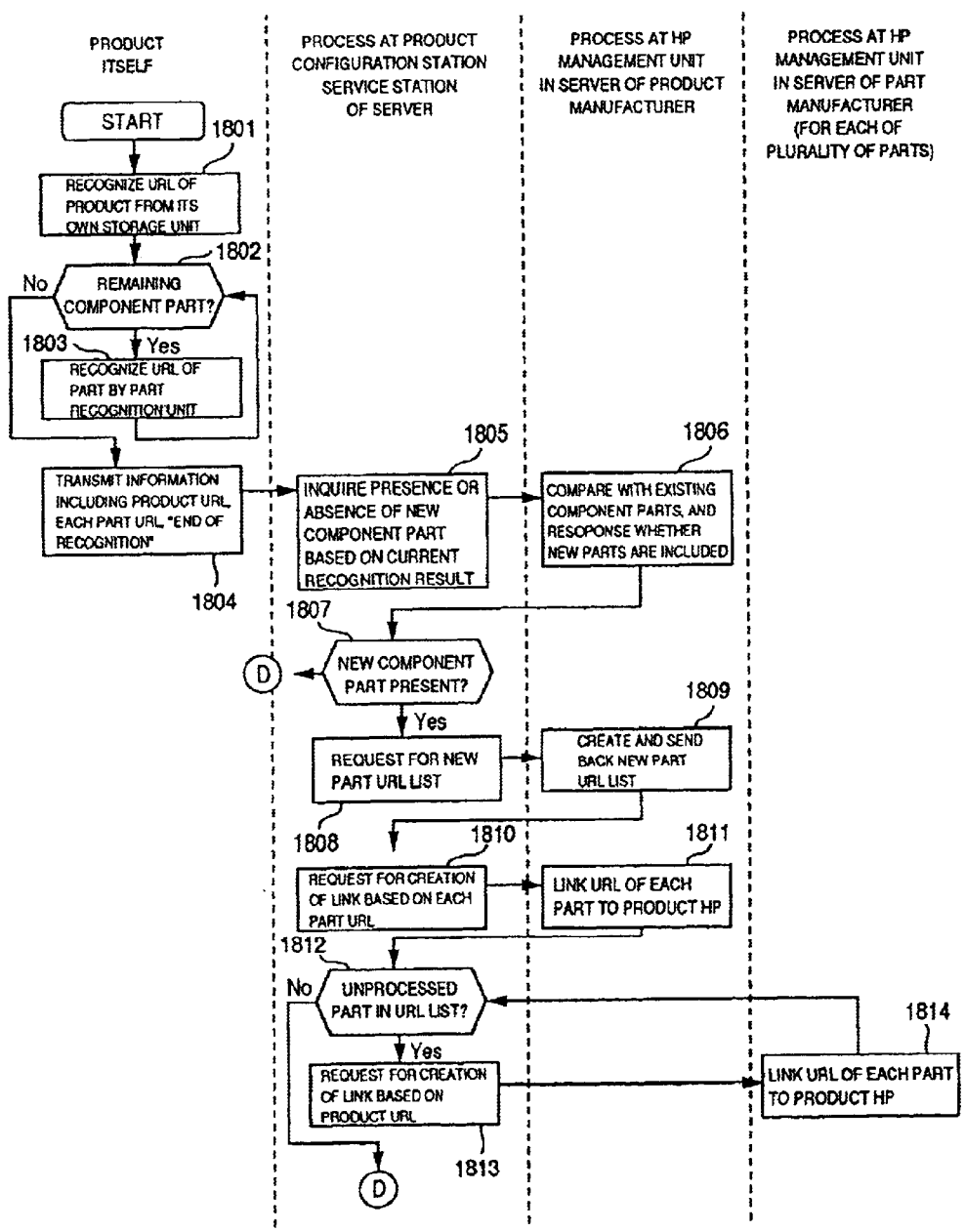
FIG. 18 is a flow chart for explaining a process of operations performed at each of associated servers when a part is incorporated in or removed from a product.

FIG. 18 is a flow chart for explaining a process of operations performed at each of associated servers when a part is incorporated in or removed from a product. In the following, this process will be explained. The flow shown herein illustrates the processes previously explained in connection with FIGS. 16, 17. The process is started after the operator has incorporated a part in the product or removed a part from the product.

(1) The product recognizes the URL of the home page of the product from its own storage unit, and checks whether or not a part has been incorporated therein. If any part has been incorporated, the part recognition unit recognizes URL of a home page of the incorporated part. This part home page URL recognition processing is performed for all of parts which have been incorporated. The product transmits information including the recognized URL of the home page of the product and URLs of the home pages of the respective parts as well as "completion of URL recognition" to the product configuration management service station (steps 1801–1804).

(2) The product configuration management service station inquires the server of the product manufacturer, based on the URLs of the home pages of the parts resulting from the current recognition, whether or not any new component parts have been included in the product (steps 1805).

(3) Since the server of the product manufacturer, in response to the inquiry at step 1805, compares information on existing component parts present in the home page with information on parts included in the information of the inquiry, and sends back a response as to the presence or absence of new parts, the product configuration management service station receives the response, and checks whether or not any new component parts have been included from the information in the received response as to the presence or absence of new parts. If included, the product configuration management service station requests the server of the product manufacturer for a home page URL list of the new parts (steps 1806–1808).

(4) Since the server of the product manufacturer creates and sends back the home page URL list of the new parts in response to the request at step 1808, the product configuration management service station receives the URL list (step 1809).

(5) The product configuration management service station requests the server of the product manufacturer, based on the URLs of the respective parts received from the server of the product manufacturer, to register the new parts in the home page of the associated product and to create links from the home page of the product to the home pages of the parts, forcing the server of the product manufacturer to create links from the home page of the product to the home pages of the parts (step 1810, 1811).

(6) The product configuration management service station checks whether or not an unprocessed part is included in the URL list. If there is any unprocessed part, the product configuration management service station requests a server of a part manufacturer of the unprocessed part, based on the URL of the product, to register the product in the home page of the part and to create a link from the home page of the part to the home page of the product, forcing the server of the part manufacturer to create a link from the home page of the part to the home page of the product. This processing is performed for all of unprocessed parts in the URL list (steps 1812–1814).

(7) If the check at step 1807 shows that no new component parts are included, or if the check at step 1812 that no unprocessed parts are found in the part home page URL list, the product configuration management service station inquires the server of the product manufacturer whether or not any component parts have been removed from the product, based on the URLs resulting from the current recognition. Then, the flow proceeds to the processing at step 1420, which has been explained in FIG. 15, followed by the execution of the flow explained in connection with FIG. 15.

Figure 19:
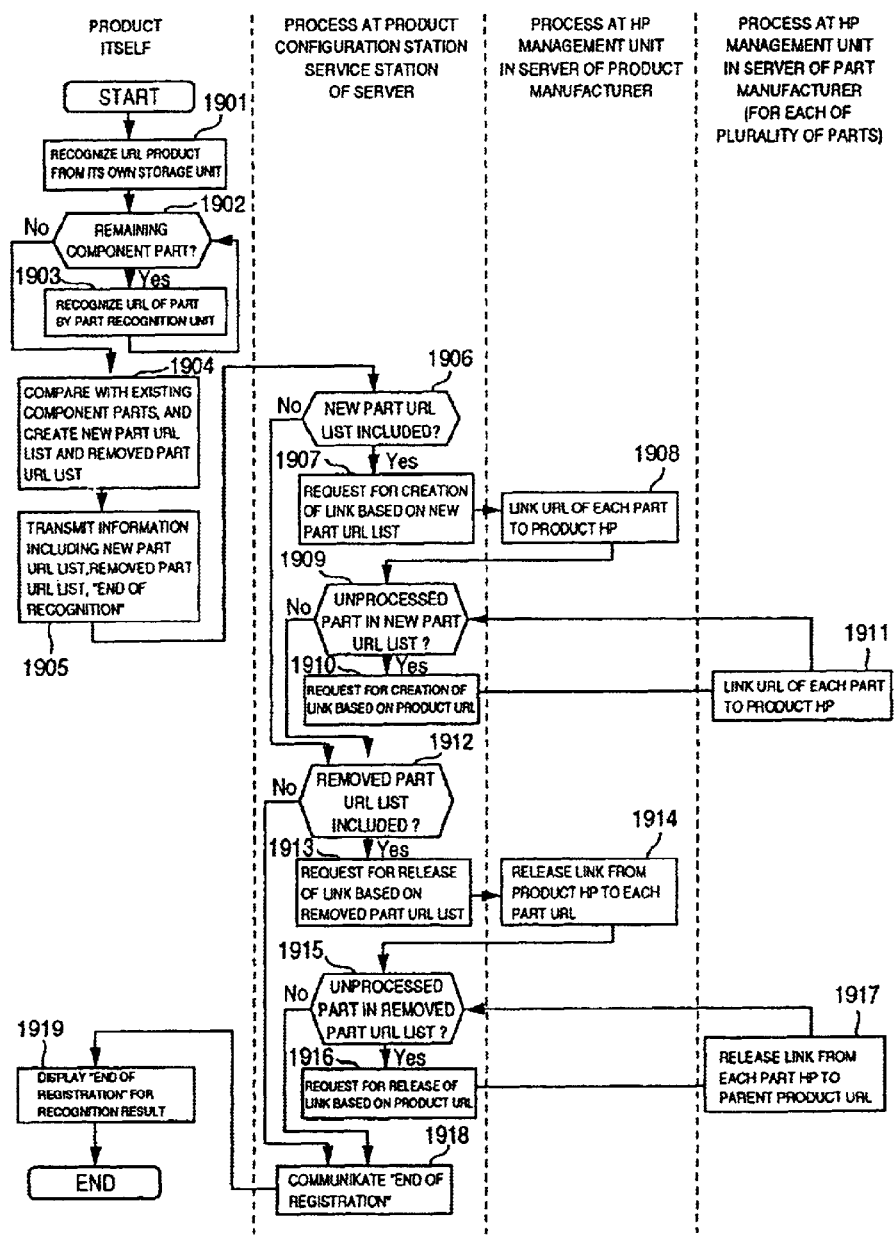
FIG. 19 is a flow chart for explaining another example of the process of operations performed at each of associated servers when a part is incorporated in or removed from a product.

FIG. 19 is a flow chart for explaining another example of the process of operations performed at each of associated servers when a part is incorporated in or removed from a product. In the following, this process will be explained. The flow shown herein illustrates a process in which the product itself is configured to have the ability of recognizing incorporation of a new component part or removal of a component part. This process is started after the operator has incorporated a part in the product or removed a part from the product.

(1) The product recognizes URL of the home page of the product from its storage unit, and checks whether or not a part has been incorporated therein. If any part has been incorporated, the part recognition unit recognizes URL of a home page of the incorporated part. This part home page URL recognition processing is performed for all of parts which have been incorporated. The product compares existing component parts with parts having the recognized URLs of home pages to create a URL list of new parts and a URL list of removed parts. Then, the product transmits information including the URL of the home page of the product, the created URL list of new parts and URL list of removed parts as well as "completion of URL recognition" to the product configuration management service station (steps 1901–1905).

(2) The product configuration management service station checks whether or not the new part URL list is included in the information sent from the product, and if included, requests the server of the product manufacturer, based on the received new part URL list, to register the new parts in the home page of the product and to create links from the home page of the product to home pages of the parts, forcing the server of the product manufacturer to create links from the home page of the product to the home pages of the parts (steps 1906–1908).

(3) Next, the product configuration management service station checks whether or not an unprocessed part is included in the new part URL list, and if included, requests a server of a part manufacturer of the unprocessed part, based on the URL of the product, to register the product in a home page of the part and to create a link from the home page of the part to the home page of the product, forcing the server of the part manufacturer to create a link from the home page of the part to the home page of the product (steps 1909–1911).

(4) If the check at step 1906 shows that no new part URL list is included, or if the check at step 1909 shows that no unprocessed parts are included in the new part URL list, the product configuration management service station checks whether or not the URL list of removed parts is included in the information sent from the product, and if included, requests the server of the product manufacturer, based on the received URL list of removed parts, to delete the registration of the removed parts from the home page of the product and to release links from the home page of the product to home pages of the parts, forcing the server of the product manufacturer to delete links from the home page of the product to the home pages of the parts (steps 1912–1914).

(5) Next, the product configuration management service station checks whether or not an unprocessed part is included in the URL list of removed parts, and if included, requests a server of a part manufacturer of the unprocessed part, based on the URL of the product, to delete the registration of the product from the home page of the part and to release a link from the home page of the part to the home page of the product, forcing the server of the part manufacturer to release a link from the home page of the part to the home page of the product (steps 1915–1917).

(6) If the check at step 1912 shows that no URL list of removed parts is included in the information sent from the product, or if the check at step 1915 shows that no unprocessed parts are included in the URL list of removed parts, the product configuration management service station transmits "end of registration" to the product. The product, upon receipt of the "end of registration," displays the "end of registration" for the recognition result, followed by the termination of a sequence of processing (step 1918, 1919).

Figure 20:
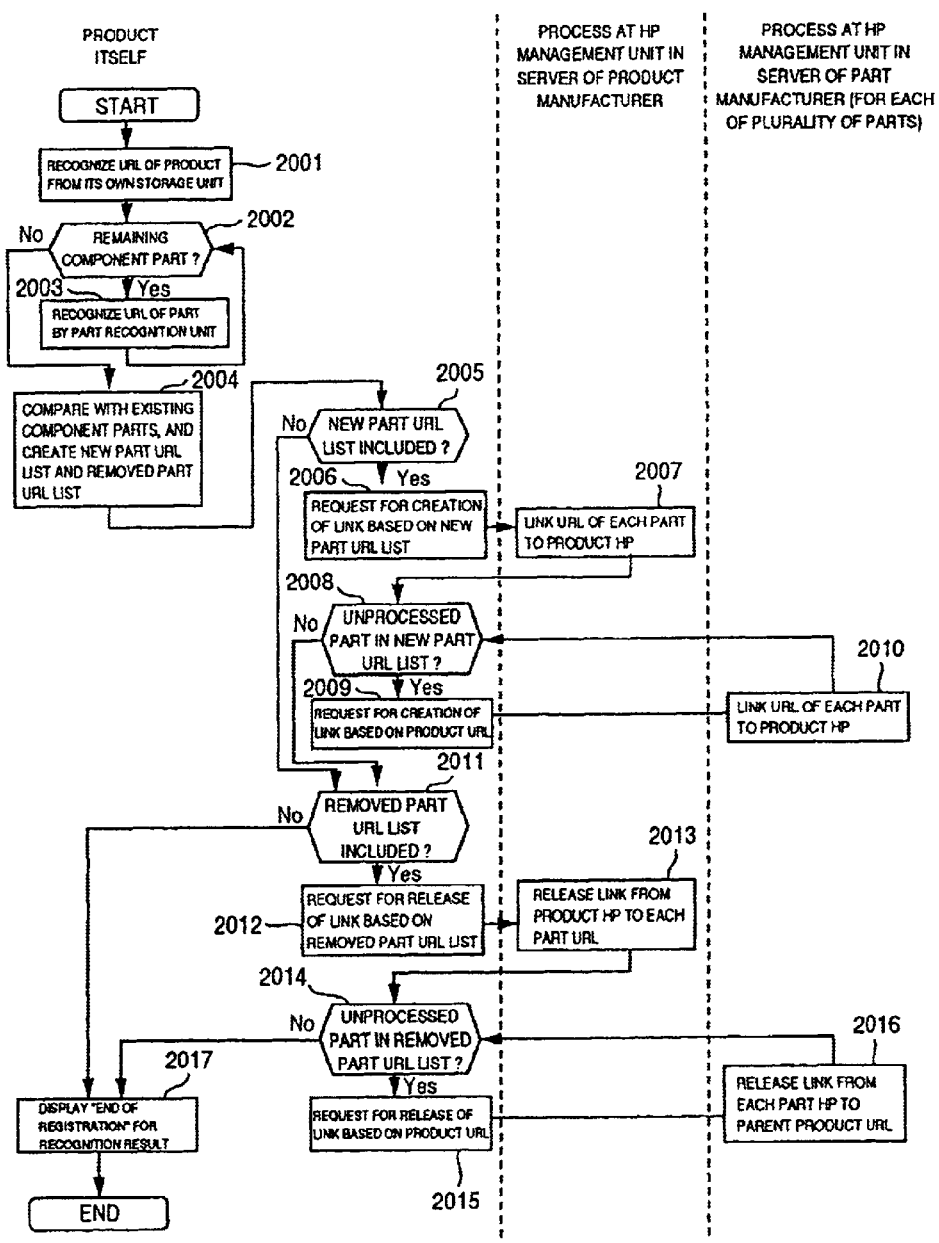
FIG. 20 is a flow chart for explaining a further example of the process of operations performed at each of associated servers when a part is incorporated in or removed from a product.

FIG. 20 is a flow chart for explaining a further example of the process of operations performed at each of associated servers when a part is incorporated in or removed from a product. In the following, this process will be explained. The flow shown herein illustrates a process in which the product itself is configured to have the ability of managing the product configuration. This process is started after the operator has incorporated a part in the product or removed a part from the product.

(1) The product recognizes the URL of the home page of the product from its storage unit, and checks whether or not a part has been incorporated therein. If any part has been incorporated, the part recognition unit recognizes URL of a home page of the incorporated part. This part home page URL recognition processing is performed for all of parts which have been incorporated. The product compares existing component parts with parts having the recognized URLs of home pages to create a URL list of new parts and a URL list of removed parts. (steps 2001–2004).

(2) The product checks whether or not the new part URL list is included in the created lists, and if included, the product requests the server of the product manufacturer, based on the new part URL list, to register the new parts in the home page of the product, and create links from the home page of the product to home pages of the parts, forcing the server of the product manufacturer to create links from the home page of the product to the home pages of the parts (steps 2005–2007).

(3) Next, the product checks whether or not an unprocessed part is included in the new part URL list, and if included, requests a server of a part manufacturer of the unprocessed part, based on the URL of the product, to register the product in a home page of the part and to create a link from the home page of the part to the home page of the product, forcing the server of the part manufacturer to create a link from the home page of the part to the home page of the product (steps 2008–2010).

(4) If the check at step 2005 shows that no new part URL list is included, or if the check at step 2008 shows that no unprocessed parts are included in the new part URL list, the product checks whether or not the URL list of removed parts is included in the created URL lists, and if included, requests the server of the product manufacturer, based on the URL list of removed parts, to delete the registration of removed parts from the home page of the product and to release links from the home page of the product to home pages of the parts, forcing the server of the product manufacturer to delete links from the home page of the product to the home pages of the parts (steps 2011–2013).

(5) Next, the product checks whether or not an unprocessed part is included in the URL list of removed parts, and if included, requests a server of a part manufacturer of the unprocessed part, based on the URL of the product, to delete the registration of the product from the home page of the part and to release a link from the home page of the part to the home page of the product, forcing the server of the part manufacturer to release a link from the home page of the part to the home page of the product (steps 2014–2016).

(6) If the check at step 2011 shows that no URL list of removed parts is included in the information sent from the product, or if the check at step 2014 shows that no unprocessed parts are included in the URL list of removed parts, the product displays "end of registration" for the recognition result, followed by the termination of a sequence of processing (step 2015).

Figure 21:
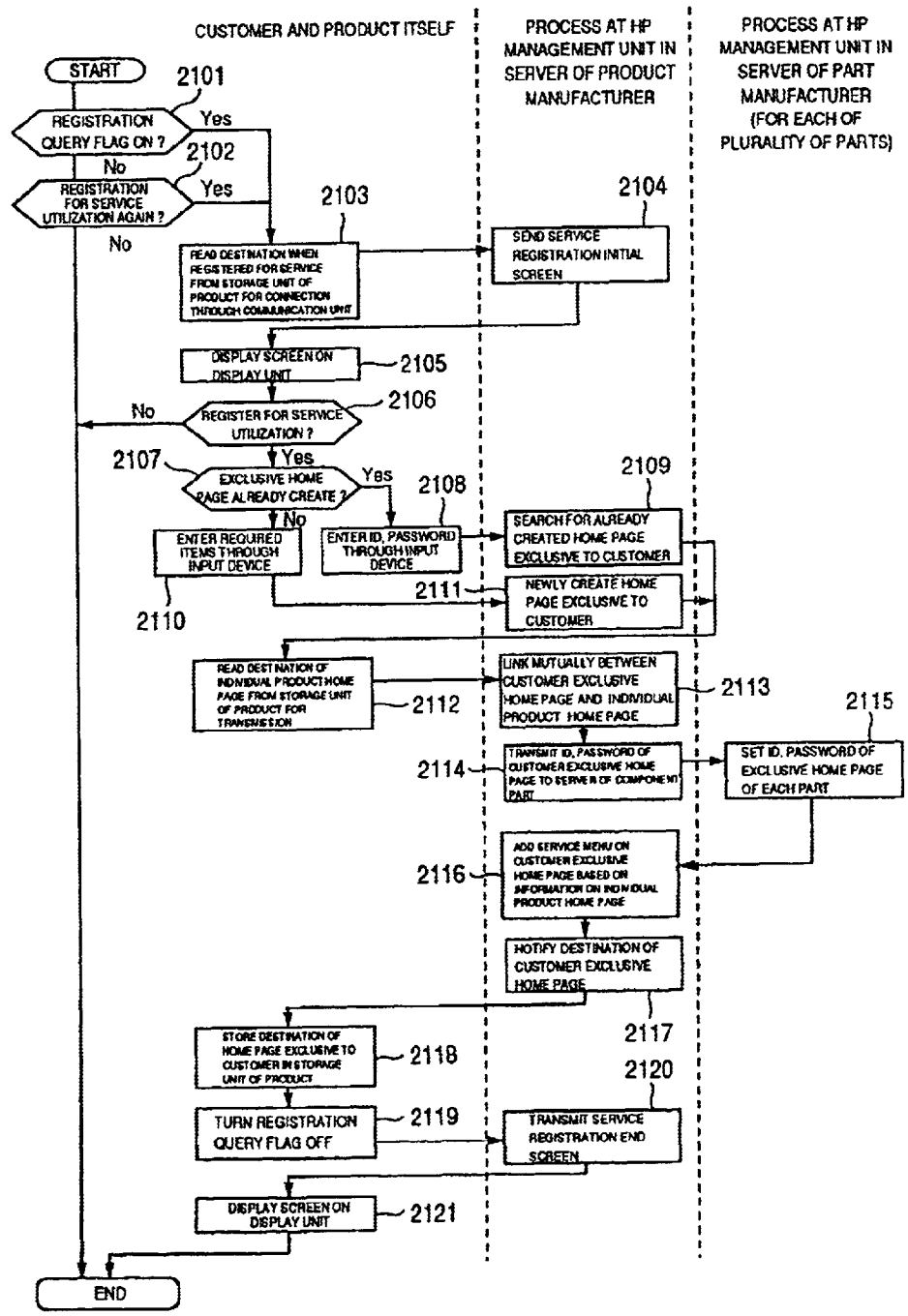
FIG. 21 is a diagram for explaining a process of operations involved in a service utilization registration for a product and its parts, performed by a customer who has the product.

FIG. 21 is a diagram for explaining a process of operations involved in a service utilization registration for a product and its parts, performed by a customer who has the product. In the following, this process will be explained.

(1) As the product is powered on, the product checks whether or not a registration query flag contained therein is ON, and if not NO, inquires the user whether or not the user will again register for service utilization. If the user rejects to again register for service utilization, the process is halted here. The registration query flag has been previously set to ON before incorporated in the product, and is turned OFF after the user who purchased the product first powers on and perform this processing (steps 2101, 2102).

(2) If the check at step 2101 shows that the flag is ON, or if the user requests at step 2102 to again register for service utilization, the product reads a destination for service registration from its storage unit, and makes a connection through the communication unit (step 2103).

(3) Upon establishment of the connection, the server of the product manufacturer transmits a service registration initial screen to the user, and the user displays the initial screen sent thereto on the display unit. On the initial screen, the user is inquired whether or not he registers for service utilization, and if the user rejects to register for service utilization, the process is halted here (steps 2104–2106).

(4) At step 2106, if the user requests to register for service utilization, the user is inquired whether or not he has already had his exclusive home page. If the user responds that he has already had his exclusive customer page, the user is prompted to enter his user ID and password through the input device. The server of the product manufacturer searches the customer database for the previously created customer exclusive home page (steps 2107–2109).

(5) At step 2107, if the user responds that he has not yet had his exclusive customer page, the user is prompted to enter required information, for example, the name, address, ID, password, and so on of the user. The server of the product manufacturer creates a customer exclusive home page for this user in the customer DB (steps 2110, 2111).

(6) The product on the user side reads information on the destination of an individual product page from its storage unit for transmission, and accesses the individual product page. In this way, the server of the product manufacturer creates a link mutually connected between the customer exclusive home page and the individual product page (steps 2112, 2113).

(7) The server of the product manufacturer notifies servers of part manufacturers of information including the ID and password of the customer exclusive home page. The servers of the part manufacturers set the IDs and passwords of exclusive home pages of the respective parts, and reports them to the server of the product manufacturer (step 2114, 2115).

(8) The server of the product manufacturer adds a service menu to the customer exclusive home page based on the information on the individual product, and notifies the product on the user side of the destination of the customer exclusive home page (steps 2116, 2117).

(9) A device on the user side records the destination of the customer exclusive home page in the storage unit of the product, and turns OFF the registration query flag if this process has been started with the registration query flag remaining ON (steps 2118, 2119).

(10) The server of the product manufacturer transmits a service registration end screen to the user, and the product or user's device displays the received end screen on the display unit, followed by the termination of the process (steps 2120, 2121).

Figure 22:
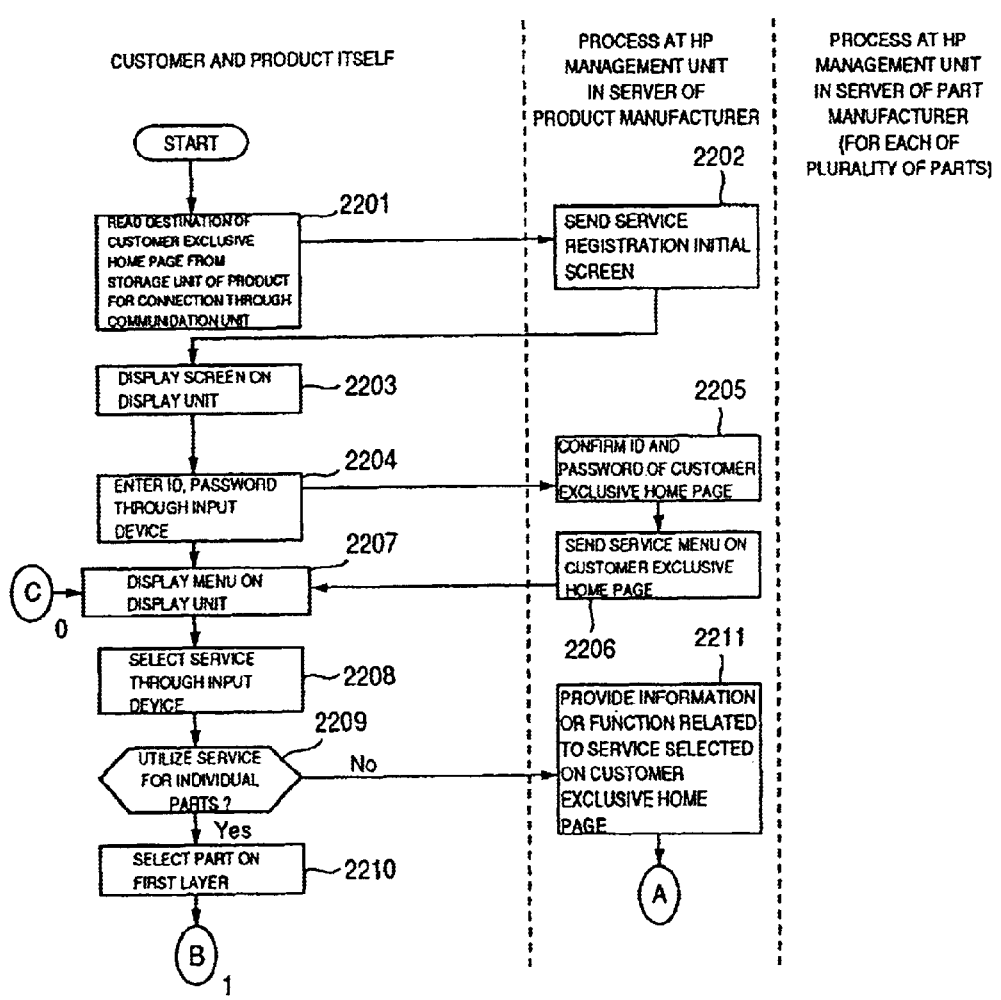
FIG. 22 is a flow chart (1) for explaining a process of operations performed when a customer utilizes a provided service after he has registered for service utilization.
Figure 23:
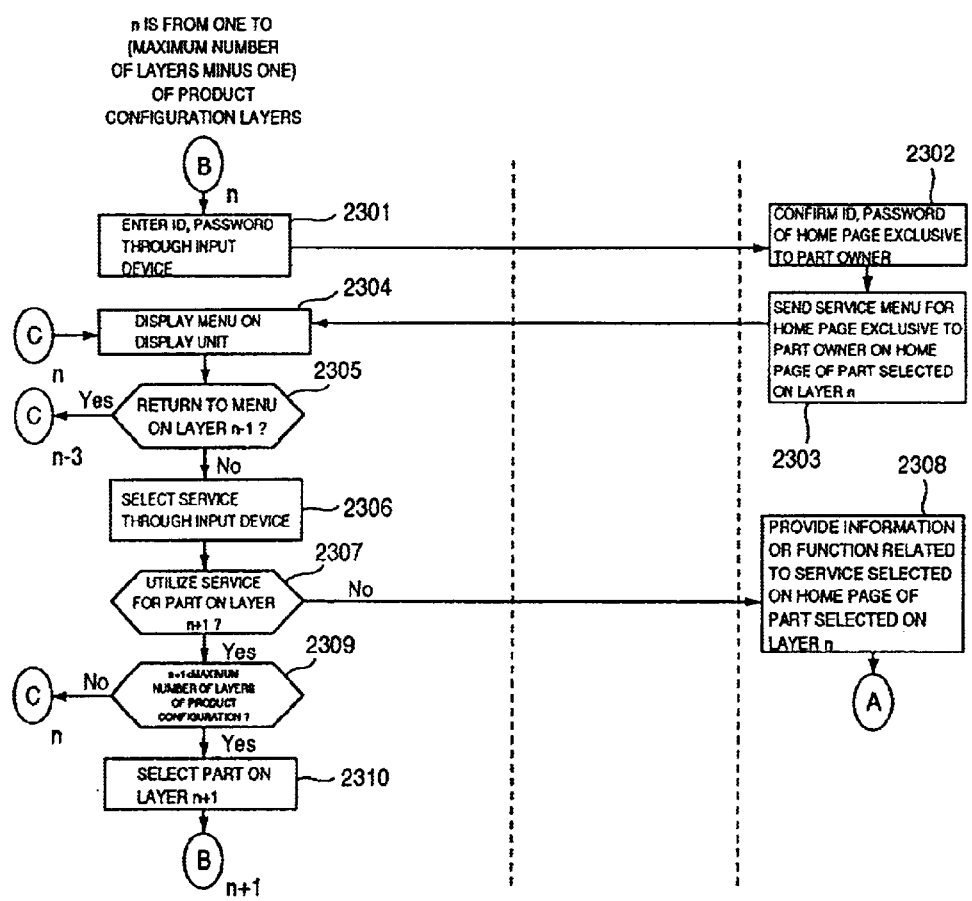
FIG. 23 is a flow chart (2) for explaining a process of operations performed when a customer utilizes a provided service after he has registered for service utilization.
Figure 24:
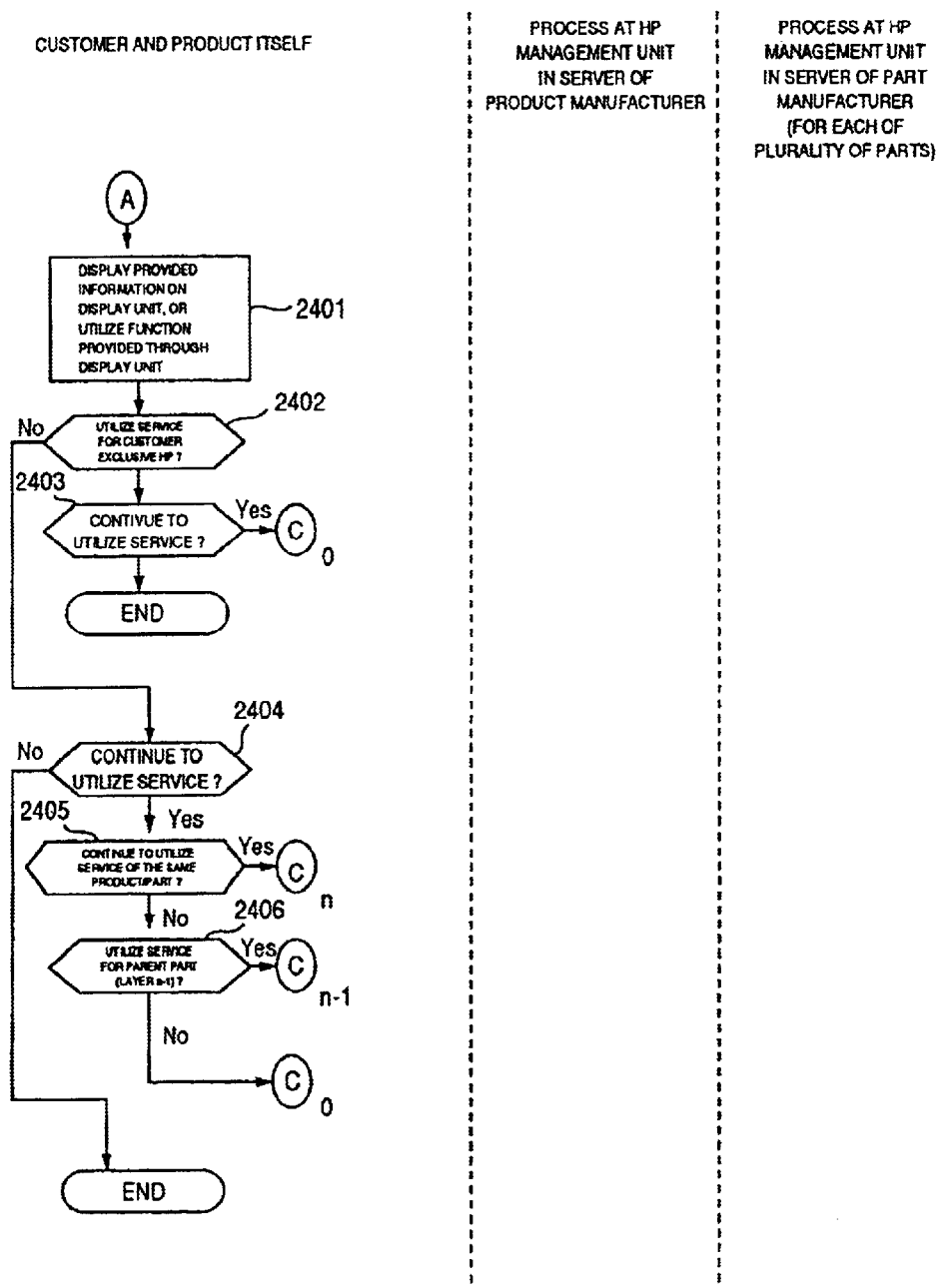
FIG. 24 is a flow chart (3) for explaining a process of operations performed when a customer utilizes a provided service after he has registered for service utilization.

FIGS. 22 to 24 are flow charts for explaining a process of operations performed when a customer utilizes a provided service after he has registered for service utilization. In the following, this processing will be explained. It should be noted that the process in FIGS. 22 to 24 are sequential, so that explanation will be given continuously without breaking for each of the figures.

(1) The user device reads the destination of a customer exclusive home page from the storage unit of the product, and makes a connection with the server of the product manufacturer through the communication unit. With the connection established, the server of the product manufacturer transmits a service utilization initial screen to the user device which displays the service utilization initial screen sent thereto on the display unit (steps 2201–2203).

(2) As the user enters the ID and password through the input device in accordance with instructions on the displayed initial screen, the server of the product manufacturer confirms the ID and password of the customer exclusive home page, sent from the user, and transmits a service menu of the customer exclusive home page to the user upon confirmation (steps 2204–2206).

(3) On the user side, the service menu is displayed on the display unit of the product. The user selects a desired service from the menu. In this event, the user also enters an option as to whether or not the user will utilize a service for individual parts (steps 2207–2209).

(4) After the user has entered at step 2209 that the user will utilize a service for individual parts, the user next selects and enters a layer of parts for which the user wishes to utilize a service. Subsequently, the user device performs the flow of the process illustrated in FIG. 23 (step 2210).

(5) If the user enters that the user will not utilize a service for individual parts at step 2209, this information is transmitted to the server of the product manufacturer which in turn sends information on the service selected for the product to the user, or sends information required for the provision of a requested function to the user. Subsequently, the user device performs the flow of a process which will be explained below in connection with FIG. 24 (step 2211).

(6) At step 2210, if the user selects and enter a layer n (n is a value from one to a maximum number of layers of the product configuration minus one) of parts for which the user wishes to utilize a service, the user enters the ID and password for a home page of a part possessed by the part manufacturer of this part.

In this way, the user device is connected to a server of the part manufacturer which in turn confirms the ID and password of the home page exclusive to the part owner, and transmits a service menu of the part owner exclusive home page to the user device on the home page of the part selected by the layer n (steps 2301–2303).

(7) On the user side, the product displays the service menu for the part on the layer n on the display unit, and inquires the user whether or not the user returns to a menu for a part on the preceding layer n−1. If the user decides that he does not return to the menu for the part on the preceding layer n−1, the user selects a desired service from the service menu for the part on the layer n (steps 2304–2306).

(8) Then, the user device inquires the user whether or not the user will utilizes a service for a part on the layer n+1. If the user enters that he will not utilize the service for the part on the layer n+1, this information is transmitted to a server of the part manufacturer of the part on the layer n. The server of the part manufacturer of the part on the layer n provides information or a function on a service selected by the user on the home page of the part selected on the layer n. Subsequently, the user device performs the flow of the process which will be explained below in connection with FIG. 24 (steps 2307, 2308).

(9) If the user enters at step 2307 that he will utilize a service for a part on the layer n+1, the user device checks whether or not n+1 is equal to or less than the maximum value of the product configuration, and selects a part on the layer n+1 when n+1 is equal to or less than the maximum value of the product configuration, and proceeds to the process from step 2301 to continue the processing for the service provided for the part on the layer n+1. Conversely, if n+1 exceeds the maximum value of the product configuration, the user device returns to step 2304 to display the service menu for the part on the layer n (step 2309, 2310).

(11) if the user enters at step 2305 that he returns to the menu of the part on the preceding layer n−1, the user device returns to display the service menu of the part on the layer n−1 at step 2304 in the flow which has been executed when a service for a part on the preceding layer n−1 has been provided.

(12) After the processing at steps 2211, 2308, the user device displays information or functions to be provided, so that the user utilizes the provided information or utilizes one of the functions provided through the display unit (step 2401).

(13) Subsequently, the user enters an option as to whether or not he will utilize a service on the customer exclusive home page. When the user continues to utilize a service on the customer exclusive home page, the flow proceeds to the processing from step 2207 for displaying the service menu on the customer exclusive home page. Otherwise, the process is terminated (steps 2402, 2403).

(14) At step 2402, if the user will not utilize a service on the customer exclusive home page, the user is again inquired whether or not he will continue to utilize the service. If not, the process is terminated. Otherwise, the user is inquired whether or not he will continue to utilize the service for the product or parts. If the user will continue to utilize the service, the flow returns to the step for displaying the service menu for the product or parts, for example, the processing at step 2304 onward (steps 2404, 2405).

(15) At step 2405, if the user will not utilize the service for the product or parts, the user is inquired whether or not he will utilize a service for a parent part. If the user will utilize a service for the parent part, the flow returns to the processing at step 2304 onward, which has been performed for the service for a part on the layer n−1. Otherwise, the flow returns to the processing from step 2207 for displaying the service menu on the customer exclusive home page (step 2406).

The flow explained with reference to FIGS. 22 to 24 has proceeded on the assumption that a customer, who is the final user of the product, utilizes information or service on the product or component parts thereof. The information on the product or component parts thereof may be available to the product manufacturer, the part manufacturers, or third parties such as parties concerned involved in sales and maintenance of the product and parts, dealers which dispose the product and parts, public organizations, and so on.

While the foregoing embodiment of the present invention has been explained on the premise that a final product user, product manufacturer and part manufacturers mutually manage the configuration of a product among them, the present invention can be applied to the management of configuration between the product and parts within a supply chain made up of a product assembling step, a disassembling step and a disposing step. In addition, this application may be added to the configuration of the embodiment of the present invention described above. Then, in this event, it is assumed that operators or operating machines involved in the product assembling step, disassembling step and disposing step are previously provided with a configuration table for a product as a type of product, and a configuration table for lower parts as component parts, in the form of templates which have similar structures to that of the home page previously described in connection with FIG. 2. In this way, the operators who are involved in the product assembling step, disassembling step and disposing step can readily manage, without errors, the configuration of products on a product number basis and the configuration of lower parts on a part-by-part basis. With such a scheme, the present invention can accomplish consistent management of the product configuration from a finally assembled product to parts at the lowermost layer and materials, and this management can be shared by the respective steps and manufacturers.

According to the foregoing embodiment of the present invention, when a product possessed by a customer can be improved in performance through version-up for any of component parts of the product, the customer can be notified, through display, of a cost required for replacement with an up-versioned component part, and resulting performance and effects. In addition, if a plurality of parts are up-versioned, it is possible to create and display a table for comparison among possible combinations of up-versioned parts for replacement in order to provide the customer with the table. In this way, the customer can order any replacement with up-versioned parts via mail or from the home page as required.

While the information on version-up as described above may be provided in such a manner that contents of services are provided from individual home pages of respective parts, it is also possible to automatically search for a service menu associated with each of component parts and collectively provide the search result which may be displayed on a home page of an associated product or a customer exclusive home page.

Also, according to the foregoing embodiment of the present invention, if a product possessed by a customer can be used for a longer lifetime by maintenance and replacement of each component part, a cost required for the replacement and a resulting extension of lifetime may be displayed for the customer. In addition, if a plurality of parts can be maintained or replaced, a table for comparison among possible combinations of replaced parts may be created and displayed in order to inform the customer of the combinations. In this way, the customer can order any maintenance and/or replacement of parts via mail or from the home page as required. The provision of information in this case can be performed in a manner similar to the aforementioned provision of version-up information.

Further, according to the foregoing embodiment of the present invention, if a customer wants to sell any component part of a product possessed by him on a used product market, sales conditions and sales price on the market can be displayed for the customer. Alternatively, if the customer wants to sell a product itself or a plurality of parts on the used product market, a table for comparison among possible combinations of sales techniques can be created and displayed to provide the customer with this information. In this way, the customer can offer a used product via mail or from the home page as required. The provision of information in this case can be performed in a manner similar to the aforementioned provision of version-up information.

Further, according to the foregoing embodiment of the present invention, if a community of users exists to investigate any of component parts of a product possessed by a customer, the customer can be informed of activities of the community and the way he joins in the community through display. Thus, the customer can apply for participation in the community via mail or from the home page as required. The provision of information in this case can be performed in a manner similar to the aforementioned provision of version-up information.

Further, according to the foregoing embodiment of the present invention, when any defect or the like is found in particular purchased parts, lots or the like, the product manufacturer can immediately list a group of products which employs the purchased parts or parts in the lots, and customers of such products. In addition, the product manufacturer can also immediately list a group of parts utilized by the part lots, and all manufacturers of these parts (including not only primary suppliers but also secondary and subsequent suppliers). In this way, the product manufacturer can take actions for obviating troubles which would otherwise be caused by the defect even, for customers who have not encountered the defect. For the suppliers, on the other hand, the product manufacturer can communicate the situation of the defect to speed up investigation on the cause of the defect.

Further, according to the foregoing embodiment of the present invention, if component parts of a product not purchased by a customer can be reused by disassembling the product, the product manufacturer can count these component parts as spare parts and therefore reduce the actual number of spare parts in stock.

Further, according to the foregoing embodiment of the present invention, it is possible to list products which employ a particular part, and final customers. This enables part manufacturers to keep track of how the parts manufactured thereby are used up to final consumers or customers and to reflect the resulting information to next product planning, service planning and so on.

Further, according to the foregoing embodiment of the present invention, it is possible to analyze how a service menu (version-up, maintenance and so on) provided for customers is utilized, and analyze action patterns of customers to provide the results. This enables the product manufacturer to reflect the resulting information to next product planning, service planning and so on.

Further, in the foregoing embodiment of the present invention, it is possible to provide dismounting dealers with information similar to the guide to used product sales for customers, as previously explained above. With the information thus provided, the dismounting dealers can determine dismounting policies for products undertaken by them for dismounting. Here, the dismounting policies refer to determination of policies as to whether the products are brought to the used product market as they are, or parts recovered from dismounted products are brought to the used product market for reuse, or the products are disposed.

Further, according to the foregoing embodiment of the present invention, industrial waste dealers may also be provided with the configuration information, so that the industrial waste dealers can create and provide detailed statistical data on parts which have been disposed as industrial wastes.

Further, according to the foregoing embodiment of the present invention, the product configuration information can be provided in response to a product connected to a network or a built-in program of a part. This enables a product or a part to switch itself to an appropriate function, or to automatically determine types, versions and so on of available software, making use of the provided component information.

Further, according to the foregoing embodiment of the present invention, a particular program can be provided in response to a request from a product connected to a network or a built-in program of a part. This enables a product or a part to automatically modify troubles and conduct self fault diagnosis, making use of a downloaded program.

According to the present invention as described above, it is possible to manage the product configuration on a product-by-product basis for each of parts comprising each of products from manufacturing to disposal, and also manage, to some degree, where individual products exist during their lifetime.

What is claimed is:

1. A product information management method for a management service device, said management service device for link management of URLs of said products and parts manufacturers, said management service device connected through a network to the following:

a products manufacturer device for a products manufacturer of products, a parts manufacturer device for parts manufacturers of parts of a product, an assembler device of an assembler of said parts or products, and said products, said method comprising the steps of:

storing a URL of a parts manufacturer and a URL of a products manufacturer in said products manufacturer device; and obtaining, when said management service device receives parts information and operation information from said assembler, an URL of a parts manufacturer for said received parts information through said network from said products manufacturer and accessing said parts manufacturer by use of said obtained URL to link or unlink said URL of said parts manufacturer based on contents of said operation information.

2. A product information management method according to claim 1, wherein each of said products has a product number thereon and each of said parts has a parts number thereon.

3. A product information management method according to claim 2, wherein said parts information and said operation information are provided by reading a product number of a product or a parts number of a part.

4. A product information management method according to claim 3, further comprising a step of:

setting said URL of said products manufacturer for each of product numbers of said products.

5. A product information management method according to claim 4, further comprising a step of:

setting said URLs of said products manufacturer for each of product purchasers of said products.

6. A product information management method according to claim 3, further comprising a step of:

setting said URLs of said products manufacturer for each of product purchasers of said products.

7. A product information management method according to claim 6, further comprising a step of:

linking between said URLs of product purchasers of said products and said URLs of product numbers of said products.

8. A product information management method according to claim 2, further comprising a step of:

setting said URLs of said products manufacturer for each of product numbers of said products.

9. A product information management method according to claim 8, further comprising a step of:
setting said URL of said products manufacturer for each of product purchasers of said products.

10. A product information management method according to claim 1, further comprising a step of:
setting said URL of said products manufacturer for each of product purchasers of said products.

11. A product information management method according to claim 10, further comprising a step of:
linking between said URLs of product purchasers of said products and said URLs of product numbers of said products.

12. A product information management system for a management service device,
said management service device for link management of URLs of said products and parts manufacturers,
said management service device connected through a network to the following:
a products manufacturer device for a products manufacturer of products,
a parts manufacturer device for parts manufacturers of parts of a product,
an assembler device of an assembler of said parts or products, and
said products,
said system comprising:
means for storing a URL of a parts manufacturer and a URL of a products manufacturer in said products manufacturer device; and
means for obtaining, when said management service device receives parts information and operation information from said assembler, an URL of a parts manufacturer for said received parts information through said network from said products manufacturer and accessing said parts manufacturer by use of said obtained URL to link or unlink said URL of said parts manufacturer based on contents of said operation information.

13. A product information management system according to claim 12, wherein each of said products has a product number thereon and each of said parts has a parts number thereon.

14. A product information management system according to claim 13, wherein said parts information and said operation information are provided by reading a product number of a product or a parts number of a part.

15. A product information management system according to claim 13, further comprising:
means for setting said URL of said products manufacturer for each of product numbers of said products.

16. A product information management system according to claim 15, further comprising:
means for setting said URL of said products manufacturer for each of product purchasers of said products.

17. A product information management system according to claim 12, further comprising:
setting said URLs of said products manufacturer for each of product purchasers of said products.

18. A product information management system according to claim 17, further comprising:
means for linking between said URLs of product purchasers of said products and said URL of product numbers of said products.

* * * * *